| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 2 | 3 | 4 | 21 | 22 | 23 | 24 | 25 | 26 | 27 | 28 | 29 | 30 | 31 | 32 |
| 2 | 5 | 6 | 7 | 8 | 9 | 10 | 11 | 12 | 13 | 14 | 15 | 16 | 17 | 18 | 19 | 20 |
| 3 | 1 | 2 | 3 | 4 | 33 | 34 | 35 | 36 | 37 | 38 | 39 | 40 | 41 | 42 | 43 | 44 |
| 4 | 45 | 46 | 47 | 48 | 49 | 50 | 51 | 52 | 53 | 54 | 55 | 56 | 57 | 58 | 59 | 60 |
| 5 | 1 | 2 | 3 | 4 | 61 | 62 | 63 | 64 | 65 | 66 | 67 | 68 | 69 | 70 | 71 | 72 |
| 6 | 5 | 6 | 7 | 8 | 9 | 10 | 11 | 12 | 13 | 14 | 15 | 16 | 17 | 18 | 19 | 20 |
| 7 | 1 | 2 | 3 | 4 | 73 | 74 | 75 | 76 | 77 | 78 | 79 | 80 | 81 | 82 | 83 | 84 |
| 8 | 85 | 86 | 87 | 88 | 89 | 90 | 91 | 92 | 93 | 94 | 95 | 96 | 97 | 98 | 99 | 100 |
| 9 | 1 | 2 | 3 | 4 | 21 | 22 | 23 | 24 | 25 | 26 | 27 | 28 | 29 | 30 | 31 | 32 |
| 10 | 5 | 6 | 7 | 8 | 9 | 10 | 11 | 12 | 13 | 14 | 15 | 16 | 17 | 18 | 19 | 20 |
| 11 | 1 | 2 | 3 | 4 | 33 | 34 | 35 | 36 | 37 | 38 | 39 | 40 | 41 | 42 | 43 | 44 |
| 12 | 45 | 46 | 47 | 48 | 49 | 50 | 51 | 52 | 101 | 102 | 103 | 104 | 105 | 106 | 107 | 108 |
| 13 | 1 | 2 | 3 | 4 | 109 | 110 | 111 | 112 | 113 | 114 | 115 | 116 | 117 | 118 | 119 | 120 |
| 14 | 5 | 6 | 7 | 8 | 9 | 10 | 11 | 12 | 13 | 14 | 15 | 16 | 17 | 18 | 19 | 20 |
| 15 | 1 | 2 | 3 | 4 | 121 | 122 | 123 | 124 | 125 | 126 | 127 | 128 | 129 | 130 | 131 | 132 |
| 16 | 133 | 134 | 135 | 136 | 137 | 138 | 139 | 140 | 141 | 142 | 143 | 144 | 145 | 146 | 147 | 148 |

FIG 1

- PRIOR ART -

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 5 | 85 | 21 | 53 | 6 | 86 | 22 | 2 | 7 | 87 | 23 | 54 | 8 | 88 | 24 |
| 2 | 3 | 9 | 89 | 25 | 55 | 10 | 90 | 26 | 4 | 11 | 91 | 27 | 56 | 12 | 92 | 28 |
| 3 | 1 | 13 | 93 | 29 | 57 | 14 | 94 | 30 | 2 | 15 | 95 | 31 | 58 | 16 | 96 | 32 |
| 4 | 3 | 17 | 97 | 33 | 59 | 18 | 98 | 34 | 4 | 19 | 99 | 35 | 60 | 20 | 100 | 36 |
| 5 | 1 | 5 | 101 | 37 | 61 | 6 | 102 | 38 | 2 | 7 | 103 | 39 | 62 | 8 | 104 | 40 |
| 6 | 3 | 9 | 105 | 41 | 63 | 10 | 106 | 42 | 4 | 11 | 107 | 43 | 64 | 12 | 108 | 44 |
| 7 | 1 | 13 | 109 | 45 | 65 | 14 | 110 | 46 | 2 | 15 | 111 | 47 | 66 | 16 | 112 | 48 |
| 8 | 3 | 17 | 113 | 49 | 67 | 18 | 114 | 50 | 4 | 19 | 115 | 51 | 68 | 20 | 116 | 52 |
| 9 | 1 | 5 | 117 | 21 | 69 | 6 | 118 | 22 | 2 | 7 | 119 | 23 | 70 | 8 | 120 | 24 |
| 10 | 3 | 9 | 121 | 25 | 71 | 10 | 122 | 26 | 4 | 11 | 123 | 27 | 72 | 12 | 124 | 28 |
| 11 | 1 | 13 | 125 | 29 | 73 | 14 | 126 | 30 | 2 | 15 | 127 | 31 | 74 | 16 | 128 | 32 |
| 12 | 3 | 17 | 129 | 33 | 75 | 18 | 130 | 34 | 4 | 19 | 131 | 35 | 76 | 20 | 132 | 36 |
| 13 | 1 | 5 | 133 | 37 | 77 | 6 | 134 | 38 | 2 | 7 | 135 | 39 | 78 | 8 | 136 | 40 |
| 14 | 3 | 9 | 137 | 41 | 79 | 10 | 138 | 42 | 4 | 11 | 139 | 43 | 80 | 12 | 140 | 44 |
| 15 | 1 | 13 | 141 | 45 | 81 | 14 | 142 | 46 | 2 | 15 | 143 | 47 | 82 | 16 | 144 | 48 |
| 16 | 3 | 17 | 145 | 49 | 83 | 18 | 146 | 50 | 4 | 19 | 147 | 51 | 84 | 20 | 148 | 52 |

FIG 2

INVENTOR
ROBERT H. HARDIN

BY
Sughrue, Rothwell, Mion, Zinn & Macpeak
ATTORNEYS

| FORMAT # | 1 | | | | | | | | | | | 4 | | | 2 | 3 |
|---|---|---|---|---|---|---|---|---|---|---|---|---|---|---|---|---|
| $C_4$ | 0 | 0 | 0 | 0 | 0 | 0 | 0 | 0 | 1 | 1 | 1 | 1 | 1 | 1 | 1 | 1 |
| $C_3$ | 0 | 0 | 0 | 0 | 1 | 1 | 1 | 1 | 0 | 0 | 0 | 0 | 1 | 1 | 1 | 1 |
| $C_2$ | 0 | 0 | 1 | 1 | 0 | 0 | 1 | 1 | 0 | 0 | 1 | 1 | 0 | 0 | 1 | 1 |
| $C_1$ | 0 | 1 | 0 | 1 | 0 | 1 | 0 | 1 | 0 | 1 | 0 | 1 | 0 | 1 | 0 | 1 |
| SAMPLING RATE, sps | | | | | | | | | | | | | | | | |
| 512 | 8 | 4 | 8 | 4 | 8 | 4 | 8 | 4 | 8 | 4 | 8 | 4 | 8 | 4 | 8 | 4 |
| 256 | 8 | 8 | 4 | 4 | 8 | 8 | 4 | 4 | 8 | 8 | 4 | 4 | 8 | 8 | 4 | 4 |
| 128 | 8 | 16 | 8 | 16 | 0 | 8 | 0 | 8 | 8 | 16 | 8 | 16 | 0 | 8 | 0 | 8 |
| 64 | 8 | 8 | 16 | 16 | 8 | 8 | 16 | 16 | 8 | 8 | 16 | 16 | 8 | 8 | 16 | 16 |
| 32 | 8 | 24 | 8 | 24 | 24 | 40 | 24 | 40 | 8 | 24 | 8 | 24 | 24 | 40 | 24 | 40 |
| 16 | 8 | 40 | 40 | 72 | 8 | 40 | 40 | 72 | 0 | 32 | 32 | 64 | 0 | 32 | 32 | 64 |
| 8 | 8 | 8 | 8 | 8 | 40 | 40 | 40 | 40 | 8 | 8 | 8 | 8 | 40 | 40 | 40 | 40 |
| 4 | 8 | 8 | 8 | 8 | 40 | 40 | 40 | 40 | 8 | 8 | 8 | 8 | 40 | 40 | 40 | 40 |
| 2 | 8 | 8 | 8 | 8 | 72 | 72 | 72 | 72 | 8 | 8 | 8 | 8 | 72 | 72 | 72 | 72 |
| 1 | 16 | 16 | 16 | 16 | 16 | 16 | 16 | 16 | 144 | 144 | 144 | 144 | 144 | 144 | 144 | 144 |

FIG 3

| | $Q_{11}$ | $Q_{12}$ | $Q_{13}$ | $Q_{14}$ | $Q_{15}$ | $Q_{16}$ | $Q_{17}$ | $Q_{18}$ | $Q_{19}$ | $Q_{110}$ | $Q_{111}$ | $Q_{112}$ | $Q_{113}$ | CHANNELS | RATE | CHANNEL NUMBERS |
|---|---|---|---|---|---|---|---|---|---|---|---|---|---|---|---|---|
| $F_1$ | X | X | 0 | X | Ø | Ø | Ø | Ø | Ø | Ø | Ø | Ø | Ø | 8 | 512 | (1 - 8) |
| $F_6$ | X | X | 1 | 0 | X | Ø | Ø | Ø | Ø | Ø | Ø | Ø | Ø | 8 | 256 | (9 - 16) |
| $F_{10}$ | X | X | 1 | 1 | 0 | X | Ø | Ø | Ø | Ø | Ø | Ø | Ø | 8 | 128 | (17 - 24) |
| $F_{15}$ | X | X | 1 | 1 | 1 | 0 | X | Ø | Ø | Ø | Ø | Ø | Ø | 8 | 64 | (25 - 32) |
| $F_{16}$ | X | X | 1 | 1 | 1 | 1 | 0 | X | Ø | Ø | Ø | Ø | Ø | 8 | 32 | (33 - 40) |
| $F_{17}$ | X | X | 1 | 1 | 1 | 1 | 1 | 0 | X | Ø | Ø | Ø | Ø | 8 | 16 | (41 - 48) |
| $F_{18}$ | X | X | 1 | 1 | 1 | 1 | 1 | 1 | 0 | X | Ø | Ø | Ø | 8 | 8 | (49 - 56) |
| $F_{19}$ | X | X | 1 | 1 | 1 | 1 | 1 | 1 | 1 | 0 | X | Ø | Ø | 8 | 4 | (57 - 64) |
| $F_{20}$ | X | X | 1 | 1 | 1 | 1 | 1 | 1 | 1 | 1 | 0 | X | Ø | 8 | 2 | (65 - 72) |
| $F_{21}$ | X | X | 1 | 1 | 1 | 1 | 1 | 1 | 1 | 1 | 1 | X | X | 16 | 1 | (73 - 88) |

FIG 4

INVENTOR
ROBERT H. HARDIN

BY
Sughrue, Rothwell, Mion, Zinn & Macpeak
ATTORNEYS

INVENTOR
ROBERT H. HARDIN

BY
Sughrue, Rothwell, Mion, Zinn & Macpeak
ATTORNEYS

INVENTOR
ROBERT H. HARDIN

BY
Sughrue, Rothwell, Mion, Zinn & Macpeak
ATTORNEYS

| CHANGE | | $Q_{11}$ | $Q_{12}$ | $Q_{13}$ | $Q_{14}$ | $Q_{15}$ | $Q_{16}$ | $Q_{17}$ | $Q_{18}$ | $Q_{19}$ | $Q_{110}$ | $Q_{111}$ | $Q_{112}$ | $Q_{113}$ | CHANNELS | RATE | CHANNEL NUMBERS |
|---|---|---|---|---|---|---|---|---|---|---|---|---|---|---|---|---|---|
| | $F_1$ | X | X | 0 | X | Ø | Ø | Ø | Ø | Ø | Ø | Ø | Ø | Ø | 8 | 512 | 1 - 8 |
| $C_1$ | $F_2$ | X | X | 0 | 0 | Ø | Ø | Ø | Ø | Ø | Ø | Ø | Ø | Ø | 4 | 512 | 1 - 4 |
| $C_1$ | $F_3$ | X | X | 0 | 1 | 0 | X | Ø | Ø | Ø | Ø | Ø | Ø | Ø | 8 | 128 | 89 - 96 |
| $C_1$ | $F_4$ | X | X | 0 | 1 | 1 | 0 | X | X | Ø | Ø | Ø | Ø | Ø | 16 | 32 | 97 - 112 |
| $C_1$ | $F_5$ | X | X | 0 | 1 | 1 | 1 | X | X | X | Ø | Ø | Ø | Ø | 32 | 16 | 113 - 144 |

INVENTOR
ROBERT H. HARDIN

BY
Sughrue, Rothwell, Mion, Zinn & Macpeak
ATTORNEYS

MULTIPLE FORMAT GENERATOR

Filed Jan. 17, 1967 20 Sheets-Sheet 6

FIG 9

| | | $Q_{11}$ | $Q_{12}$ | $Q_{13}$ | $Q_{14}$ | $Q_{15}$ | $Q_{16}$ | $Q_{17}$ | $Q_{18}$ | $Q_{19}$ | $Q_{110}$ | $Q_{111}$ | $Q_{112}$ | $Q_{113}$ | NUMBER OF CHANNELS | SAMPLING RATE, SPS | CHANNEL NUMBERS | |
|---|---|---|---|---|---|---|---|---|---|---|---|---|---|---|---|---|---|---|
| | $F_1$ | X | X | 0 | X | Ø | Ø | Ø | Ø | Ø | Ø | Ø | Ø | Ø | 8 | 512 | 1 - 8 | |
| $C_1$ | $F_2$ | X | X | 0 | 0 | Ø | Ø | Ø | Ø | Ø | Ø | Ø | Ø | Ø | 4 | 512 | 1 - 4 | |
| $C_1$ | $F_3$ | X | X | 0 | 1 | 0 | X | Ø | Ø | Ø | Ø | Ø | Ø | Ø | 8 | 128 | 89 - 96 | CHANNELS ADDED BY $C_1$ |
| $C_1$ | $F_4$ | X | X | 0 | 1 | 1 | 0 | X | X | Ø | Ø | Ø | Ø | Ø | 16 | 32 | 97 - 112 | CHANNELS ADDED BY $C_1$ |
| $C_1$ | $F_5$ | X | X | 0 | 1 | 1 | 1 | X | X | X | Ø | Ø | Ø | Ø | 32 | 16 | 113 - 144 | CHANNELS ADDED BY $C_1$ |
| | $F_6$ | X | X | 1 | 0 | X | Ø | Ø | Ø | Ø | Ø | Ø | Ø | Ø | 8 | 256 | 9 - 16 | |
| $C_2$ | $F_7$ | X | X | 1 | 0 | 0 | Ø | Ø | Ø | Ø | Ø | Ø | Ø | Ø | 4 | 256 | 9 - 12 | |
| $C_2$ | $F_8$ | X | X | 1 | 0 | 1 | 0 | X | Ø | Ø | Ø | Ø | Ø | Ø | 8 | 64 | 145 - 152 | CHANNELS ADDED BY $C_2$ |
| $C_2$ | $F_9$ | X | X | 1 | 0 | 1 | 1 | X | X | X | Ø | Ø | Ø | Ø | 32 | 16 | 153 - 184 | CHANNELS ADDED BY $C_2$ |
| | $F_{10}$ | X | X | 1 | 1 | 0 | X | Ø | Ø | Ø | Ø | Ø | Ø | Ø | 8 | 128 | 17 - 24 | |
| $C_3$ | $F_{11}$ | X | X | 1 | 1 | 0 | 0 | X | X | Ø | Ø | Ø | Ø | Ø | 16 | 32 | 185 - 200 | CHANNELS ADDED BY $C_3$ |
| $C_3$ | $F_{12}$ | X | X | 1 | 1 | 0 | 1 | 0 | X | X | X | Ø | Ø | Ø | 32 | 8 | 201 - 232 | CHANNELS ADDED BY $C_3$ |
| $C_3$ | $F_{13}$ | X | X | 1 | 1 | 0 | 1 | 1 | 0 | X | X | X | Ø | Ø | 32 | 4 | 233 - 264 | CHANNELS ADDED BY $C_3$ |
| $C_3$ | $F_{14}$ | X | X | 1 | 1 | 0 | 1 | 1 | 1 | X | X | X | X | Ø | 64 | 2 | 265 - 328 | CHANNELS ADDED BY $C_3$ |
| | $F_{15}$ | X | X | 1 | 1 | 1 | 0 | X | Ø | Ø | Ø | Ø | Ø | Ø | 8 | 64 | 25 - 32 | |
| | $F_{16}$ | X | X | 1 | 1 | 1 | 1 | 0 | X | Ø | Ø | Ø | Ø | Ø | 8 | 32 | 33 - 40 | |
| $C_4$ | $F_{17}$ | X | X | 1 | 1 | 1 | 1 | 1 | 0 | X | Ø | Ø | Ø | Ø | 8 | 16 | 41 - 48 | |
| $C_4$ | $F'_{17}$ | X | X | 1 | 1 | 1 | 1 | 1 | 0 | X | X | X | X | X | 128 | 1 | 329 - 456 | CHANNELS ADDED BY $C_4$ |
| | $F_{18}$ | X | X | 1 | 1 | 1 | 1 | 1 | 1 | 0 | X | Ø | Ø | Ø | 8 | 8 | 49 - 56 | |
| | $F_{19}$ | X | X | 1 | 1 | 1 | 1 | 1 | 1 | 1 | 0 | X | Ø | Ø | 8 | 4 | 57 - 64 | |
| | $F_{20}$ | X | X | 1 | 1 | 1 | 1 | 1 | 1 | 1 | 1 | 0 | X | Ø | 8 | 2 | 65 - 72 | |
| | $F_{21}$ | X | X | 1 | 1 | 1 | 1 | 1 | 1 | 1 | 1 | 1 | X | X | 16 | 1 | 73 - 88 | |

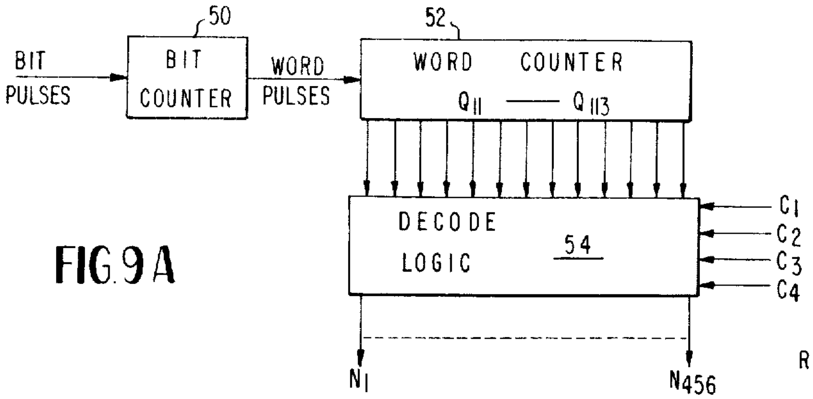

FIG 9A

INVENTOR
ROBERT H. HARDIN

BY
Sughrue, Rothwell, Mion, Zinn & Macpeak
ATTORNEYS

April 28, 1970 R. H. HARDIN 3,509,540

MULTIPLE FORMAT GENERATOR

Filed Jan. 17, 1967 20 Sheets-Sheet 7

INVENTOR

ROBERT H. HARDIN

BY

Sughrue, Rothwell, Mion, Zinn & Macpeak

ATTORNEYS

INVENTOR
ROBERT H. HARDIN

BY
Sughrue, Rothwell, Mion, Zinn & Macpeak
ATTORNEYS

INVENTOR
ROBERT H. HARDIN

BY *Sughrue, Rothwell, Mion, Zinn & Macpeak*
ATTORNEYS

INVENTOR
ROBERT H. HARDIN

BY
Sughrue, Rothwell, Mion, Zinn & Macpeak
ATTORNEYS

INVENTOR
ROBERT H. HARDIN

BY
Sughrue, Rothwell, Mion, Zinn & Macpeak
ATTORNEYS

INVENTOR
ROBERT H. HARDIN
BY
Sughrue, Rothwell, Mion, Zinn & Macpeak
ATTORNEYS

INVENTOR
ROBERT H. HARDIN
BY
*Sughrue, Rothwell, Mion, Zinn & Macpeak*
ATTORNEYS April 28, 1970 R. H. HARDIN 3,509,540
MULTIPLE FORMAT GENERATOR
Filed Jan. 17, 1967 20 Sheets-Sheet 14

INVENTOR
ROBERT H. HARDIN
BY
Sughrue, Rothwell, Mion, Zinn & Macpeak
ATTORNEYS

INVENTOR
ROBERT H. HARDIN
BY Sughrue, Rothwell, Mion, Zinn & Macpeak
ATTORNEYS

INVENTOR
ROBERT H. HARDIN

BY

Sughrue, Rothwell, Mion, Zinn & Macpeak
ATTORNEYS

| | CHANGES | NUMBER OF CHANNELS | RATE | CHANNEL NUMBERS | $Q_{21}$ | $Q_{22}$ | $Q_{23}$ | $Q_{24}$ | $Q_{25}$ | $Q_{26}$ | $Q_{27}$ | $Q_{28}$ | $Q_{29}$ |
|---|---|---|---|---|---|---|---|---|---|---|---|---|---|
| $F'_{17}$ | $C_4$ | 128 | 1 | 329 - 456 | X | X | 0 | 0 | X | X | X | X | X |
| $F_{14}$ | $C_3$ | 64 | 2 | 265 - 328 | X | X | 0 | 1 | 0 | X | X | X | X |
| $F_{13}$ | $C_3$ | 32 | 4 | 233 - 264 | X | X | 0 | 1 | 1 | 0 | X | X | X |
| $F_{12}$ | $C_3$ | 32 | 8 | 201 - 232 | X | X | 0 | 1 | 1 | 1 | X | X | X |
| $F_9$ | $C_2$ | 32 | 16 | 153 - 184 | X | X | 1 | 0 | 0 | 0 | X | X | X |
| $F_5$ | $C_1$ | 32 | 16 | 113 - 144 | X | X | 1 | 0 | 0 | 1 | X | X | X |
| $F_4$ | $C_1$ | 16 | 32 | 97 - 112 | X | X | 1 | 0 | 1 | 0 | 0 | X | X |
| $F_{11}$ | $C_3$ | 16 | 32 | 185 - 200 | X | X | 1 | 0 | 1 | 0 | 1 | X | X |
| $F_{21}$ | – | 16 | 1 | 73 - 88 | X | X | 1 | 0 | 1 | 1 | 0 | X | X |
| $F_1$ | – | 8 | 512 | 1 - 8 | X | X | 1 | 1 | 1 | 0 | 0 | 0 | X |
| $F_3$ | $C_1$ | 8 | 128 | 89 - 96 | X | X | 1 | 1 | 0 | 1 | 1 | 1 | X |
| $F_6$ | – | 8 | 256 | 9 - 16 | X | X | 1 | 1 | 0 | 1 | 1 | 0 | X |
| $F_8$ | $C_2$ | 8 | 64 | 145 - 152 | X | X | 1 | 1 | 0 | 1 | 0 | 1 | X |
| $F_{10}$ | – | 8 | 128 | 17 - 24 | X | X | 1 | 1 | 0 | 1 | 0 | 0 | X |
| $F_{15}$ | – | 8 | 64 | 25 - 32 | X | X | 1 | 1 | 0 | 0 | 1 | 1 | X |
| $F_{16}$ | – | 8 | 32 | 33 - 40 | X | X | 1 | 1 | 0 | 0 | 1 | 0 | X |
| $F_{17}$ | – | 8 | 16 | 41 - 48 | X | X | 1 | 1 | 0 | 0 | 0 | 1 | X |
| $F_{18}$ | – | 8 | 8 | 49 - 56 | X | X | 1 | 1 | 0 | 0 | 0 | 0 | X |
| $F_{19}$ | – | 8 | 4 | 57 - 64 | X | X | 1 | 0 | 1 | 1 | 1 | 1 | X |
| $F_{20}$ | – | 8 | 2 | 65 - 72 | X | X | 1 | 0 | 1 | 1 | 1 | 0 | X |
| $F_2$ | $C_1$ | 4 | 512 | 1 - 4 | X | X | 1 | 1 | 1 | 0 | 0 | 0 | 0 |
| $F_7$ | $C_2$ | 4 | 256 | 9 - 12 | X | X | 1 | 1 | 0 | 1 | 1 | 0 | 0 |

FIG 34

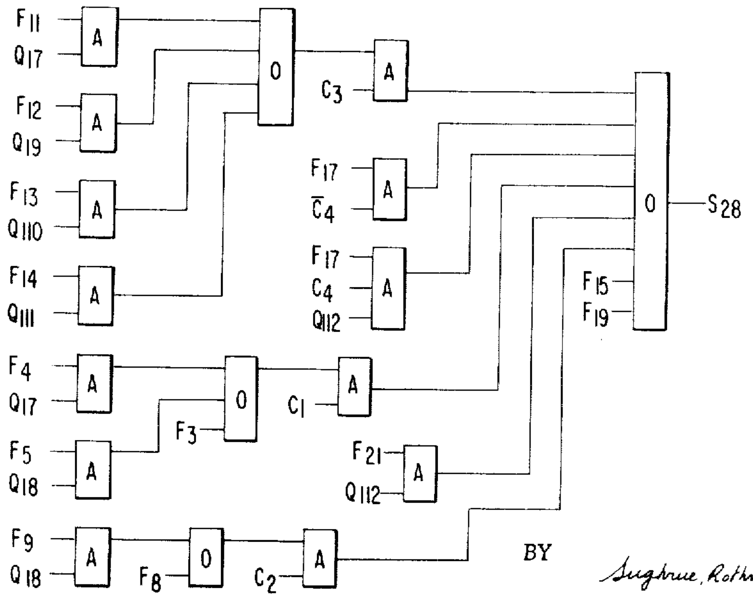

FIG 37

INVENTOR
ROBERT H. HARDIN

BY

Sughrue, Rothwell, Mion, Zinn, & Macpeak
ATTORNEYS

INVENTOR
ROBERT H. HARDIN
BY
Sughrue, Rothwell, Mion, Zinn, & Macpeak
ATTORNEYS

INVENTOR
ROBERT H. HARDIN

BY

Sughrue, Rothwell, Mion, Zinn & Macpeak
ATTORNEYS

INVENTOR
ROBERT H. HARDIN

BY
Sughrue, Rothwell, Mion, Zinn & Macpeak
ATTORNEYS

United States Patent Office 3,509,540

Patented Apr. 28, 1970

3,509,540

MULTIPLE FORMAT GENERATOR

Robert H. Hardin, Littleton, Colo., assignor to Martin-Marietta Corporation, New York, N.Y., a corporation of Maryland Filed Jan. 17, 1967, Ser. No. 609,866
Int. Cl. G06m 3/02
U.S. Cl. 340—172.5 22 Claims

ABSTRACT OF THE DISCLOSURE

A format generator which produces gating or sampling impulses on multiple lines for the purpose of sampling multiple data units respectively or which produces multiple addresses on a single line for the purpose of sampling multiple data units respectively. The total generator output, referred to as the format, is capable of sampling individual data sources at different rates. A word counter advances one count for each word pulse input and the word counter stage outputs are applied to decode logic circuitry which energizes the correct line or applies the correct address over the single line. Control inputs to the decode logic circuit enable the generator to produce a number of different formats.

The present invention relates to multiple format generating systems.

A format may be a plurality of addresses occurring in a desired sequence on a single line or a desired sequence of outputs on a plurality of lines. In telemetry systems the addresses may address various sources which are sampled and the information therefrom transmitted to a desired location, or the plurality of lines may each address one of the sources causing sampling and transmission of the sampled information. In both cases, the format controls the arrangement of information transmitted, e.g., it controls what sources are sampled and when they are sampled.

It is often necessary in telemetry systems to provide data from multiple sources wherein the sources are sampled at various rates. Thus, if each source is assigned a particular address which is effective to cause sampling of that source, it is necessary for some addresses to occur more often than others. Consequently a relatively complex addressing means is necessary.

Furthermore, a telemetering requirement may be to change the format of the data being transmitted. This may take the form of eliminating some sources and adding others. The newly added sources need not be at the same sampling rate as the eliminated sources, thus complicating the problem.

The present invention provides a means by which multiple formats may be generated with the least amount of complexity. Two general types of data selection systems will be discussed. The first is the remote multiplexing system wherein the addresses are transmitted over a single address line to the sources. Any particular address causes sampling of a single source. The other type of system is the multiple line addressing system wherein a separate line may be used for each address.

A better understanding of the invention can be had from the following more particular description of preferred embodiments of the invention, as illustrated in the accompanying drawings.

FIGURE 1 is a table illustrating the prior art arrangement of assigning slots to the sources;

FIGURE 2 is a table illustrating the systematic assignment of slots to the sources;

FIGURE 3 is a table illustrating the formats possible by making different combinations of four basic changes;

FIGURE 4 is a table illustrating the word counter states or codes for the first format to be generated;

FIGURES 6 and 7 are block diagrams showing a preferred embodiment of part of the decoding apparatus of the present invention;

FIGURES 8 and 9 are tables illustrating the word counter states or codes for one of the basic format changes and for all format changes respectively;

FIGURE 9A is a block diagram of a preferred embodiment of the present invention;

FIGURE 34 is a table illustrating the addresses assigned to the sources in a second preferred embodiment;

FIGURES 35 through 38 are block diagrams of logic circuits used in the decoding apparatus of the second preferred embodiment.

Figure 5:
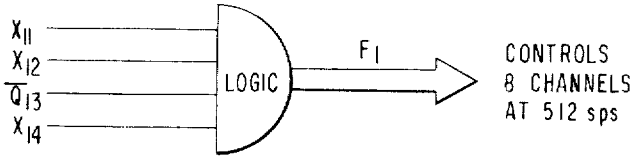
FIGURE 5 is a block diagram of a decoding system used in a preferred embodiment of the present invention.

In order to understand generally the problem of sampling various sources at various rates, a simple example will be given with reference to FIGURES 1 and 2 and Table I below.

TABLE I.—SIMPLE FORMAT

| Channel numbers | Number of channels | Sampling rate, s.p.s. | "Slots" per frame |
|---|---|---|---|
| 1 thru 4 | 4 | 8 | 32 |
| 5 thru 20 | 16 | 4 | 64 |
| 21 thru 52 | 32 | 2 | 64 |
| 53 thru 148 | 96 | 1 | 96 |

In the example there are 148 sources, referred to as channels, which are sampled at various rates from once per frame to eight times per frame. For ease of understanding, it is assumed that a frame time is one second. A frame includes all the data for a complete cycle. From the fourth column, it is seen that the 148 channels require 256 slots or words.

A typical unsystematic way of apportioning the words is shown in FIGURE 1 wherein each square represents a word slot and the numbers in the squares represent a data word from the source of the same number. Also, time-wise, the chart is read from left to right and then from top to bottom. The 256 squares represent the total frame of 256 slots. Since the frame is one second long, the word time is obviously 1/256 second.

The figure indicates the following sequence: During the first slot time source 1 is sampled; during the next slot time source 2 is sampled; etc.; during the 16th slot time source 32 is sampled; during the 17th slot time source 5 is sampled; and so on. It is seen that the requirements of the above Table I are met because channels 1–4 are sampled eight times per second, 5–20 are sampled 4 times per second, 21–52 are sampled twice per second, and 53–148 are sampled once per second.

The channels have been unsystematically grouped according to their sampling rates in the manner as done in the prior art. Considerably more logic is required to generate the sampling gate control signals (addresses) for the prior art grouping than for the systematic grouping of the present invention. Furthermore, when the channels are systematically grouped, only a simple addition of logic allows multiple formats to be generated.

In accordance with the prior art grouping of FIG. 1, addressing of the 148 sources would be accomplished as follows. An eight-stage word counter generates 256 unique combinations of ones and zeroes and each combination represents one of the 256 slots in the format frame. To generate the sampling signals, an eight-input decoding gate would be needed for all 148 channels.

Thus, to illustrate, an eight-input decode gate which responds to the state 11111111 of the counter would provide a signal to sample source 148. An eight-gate decode gate which responds to the state 01111111 of the counter would provide a signal to sample source 147. In order to vary the format, an additional word counter and additional decode gates would be necessary.

A systematic way of apportioning the 256 slots among the 148 channels allows many decode gates to have less than eight inputs, and separates the channels of the same sampling rate by uniform amounts. The latter separation allows easy facilitation of multiple format generation.

An eight-state counter is necessary to define the 256 slots. The slots are assigned to the channels according to the following steps. For all channels at the same rate (e.g., 4 channels at 8 samples per second) assign don't care values ($\phi$) to enough of the highest order stages to insure the correct sampling rate. Next leave enough stages variable (described as X) so that the variable stages can generate a number of unique combinations equal to the number of channels (e.g., two stages assigned X values can generate four unique combinations thus defining the four channels). As the last step, assign either 1's or 0's to the remaining stages. The latter assignment may be arbitrary, but it is necessary to insure that no state or code of the eight-stage counter is assigned to more than one channel.

Table II below illustrates the logical states of the counter corresponding to the channels. As stated above, the $\phi$'s represent "don't care" values and are not decoded to define the channels listed to the right. The X's may be 1's or 0's.

TABLE II.—WORD COUNTER STATE CHART

| Stage number 1 2 3 4 5 6 7 8 | Number of channels | Sampling rate, s.p.s. |
|---|---|---|
| 0 0 0 X X $\phi$ $\phi$ $\phi$ | 4 | 8 |
| 0 0 1 X X X X X | 32 | 1 |
| 0 1 X X X X X X | 64 | 1 |
| 1 0 X X X X $\phi$ $\phi$ | 16 | 4 |
| 1 1 X X X X X $\phi$ | 32 | 2 |

An explanation of the logical states for the four channels at eight samples per second will provide a better understanding of the system. The logical state of the counter assigned to the four channels is 0 0 0 X X $\phi$ $\phi$ $\phi$ The logical term 0 0 0 X X actually defines four unique combinations. They are:

0 0 0 0 0

0 0 0 1 0

0 0 0 0 1

0 0 0 1 1

Thus the four channels are defined by the four unique combinations. Also, since three stages are assigned "don't cares," each of the unique combinations mentioned above will occur eight ($2^3=8$) times every time the counter sequences from zero to 256. The zeroes are assigned to the first three stages arbitrarily. Note, in Table II that the assigned 1's and 0's must be different for all groups of channels, and all assignments must encompass all possible word counter states.

(Note that the assumption is made that we are talking about the most typical type of binary counter; one in which $n$ stages count up to $2^n$. However, it will be apparent that binary counters can be wired to recycle in response to less than $2^n$ input pulses. For example a standard 4 stage binary counter counts to 16 and recycles. $2^4=16$. However, the four stages may be wired to recycle at the count of ten thus providing a decode counter. Although the entire specification describes examples wherein $n$ stages produce $2^n$ unique combinations it should be kept in mind that the invention applies equally to situations wherein $n$ stages are wired to produce less than $2^n$ unique combinations. To illustrate by specific example, if the fourth and fifth stages of the above word counter are wired to provide only three unique combinations, 00, 01, 10, then the logical term 000XX would define three channels rather than four channels. Furthermore, the three $\phi$ stages could be wired to provide less than eight unique combinations resulting in an occurrence rate of less than eight times per frame.)

It should be noted that after assigning $\phi$'s to the three highest order stages, the two X's necessary to define four channels (four unique combinations) could have been placed in any of the other stages. However, they are placed in the remaining highest order stages to insure uniform separation. Stated another way, 00000$\phi\phi\phi$ is separated from 00010$\phi\phi\phi$ by eight counts or word slots. It takes eight input pulses to the counter for it to traverse from the former state to the latter. The same is true for the separation of 00010$\phi\phi\phi$ and 00001$\phi\phi\phi$.

If the X's had been assigned to the first two stages, the four unique combinations would come one right after another. Thus, the number of X's in the code determines the number of channels which can be controlled by the code and the position of the X's determines the separation (in number of slots) of the channels. The number of $\phi$'s determines the rate of occurrence of each channel code for a single frame.

For generic purposes, the following letter designations are used: The word counter contains $n$ stages, and for any given code assignment, $s$ stages are assigned $\phi$'s and $v$ stages are assigned X's. The remaining stages $[n-(s+v)]$ are assigned definite ones and zeroes. The number of channels for the code word depends on $v$ stages, the most common circumstances being $2^v$ channels. The rate of occurrence of each channel depending upon the $s$ stages, the most common being $2^s$ times per frame.

Referring to row two of Table II, it is seen that the logical state 001XXXXX defines thirty-two ($2^5=32$) unique channels, and each unique channel code occurs only once for a frame. The 001 in the first three stages insures that the 32 channels at 1 sample per second do not have the same code as any of the 4 channels at eight samples per second.

The format generated by the systematic apportioning of slots to the channels is illustrated in FIGURE 2, which is read in the same manner as FIGURE 1. To generate this format, decode gates for the four channels having eight samples per second require only five inputs; decode gates for the 16 channels having four samples per second require only six inputs; decode gates for the 32 channels having two samples per second require seven inputs; and decode gates for the 96 channels having one sample per second require eight inputs.

The latter paragraph assumes that decode gates are used, but as will appear later, single line addressing may be used instead. The above example is for the purpose of pointing out how the different channels may be assigned individual codes which correspond to states of a word counter wherein all stages do not enter into the codes of all channels, and channels of like sampling rates are separated uniformly. When the number of "slots" per frame increases into the thousands, and the number of channels increases into the hundreds, it is obviously very inconvenient to represent the format by a chart similar to those in FIGURES 1 and 2. But with the systematic way of apportioning the "slots," the format is completely described by a word counter state chart similar to that in Table II.

In order to understand the multiple format control features of the invention a specific embodiment will be described. Certain assumptions are made herein for purposes of explaining the specific embodiment, but it will be apparent that the invention is not limited to any of the assumptions. The assumptions are: the formats to be generated are those shown in Table III below; there are 8192 word slots per frame; the frame rate is one frame per second; there are a total of 456 sources to be sampled; the channels are to be grouped in fours (referred to as a quad channel). The reason for the last requirement is because it may be necessary for a given source to be on the data line for longer than a one word period. Thus, four channels in a group could control one source for four word times rather than four sources at one word time apiece. It is apparent that under such a requirement, all four channels must have the same sample rate.

TABLE III

| Sampling rate, s.p.s. | Number of channels | | | |
|---|---|---|---|---|
| | Format #1 | Format #2 | Format #3 | Format #4 |
| 512 | 8 | 8 | 4 | 4 |
| 256 | 8 | 4 | 4 | 4 |
| 128 | 8 | 0 | 8 | 16 |
| 64 | 8 | 16 | 16 | 16 |
| 32 | 8 | 24 | 40 | 24 |
| 16 | 8 | 32 | 64 | 64 |
| 8 | 8 | 40 | 40 | 8 |
| 4 | 8 | 40 | 40 | 8 |
| 2 | 8 | 72 | 72 | 8 |
| 1 | 16 | 144 | 144 | 144 |

In Table III the sampling rates are shown in the left-hand column and the number of channels sampled at the respective sampling rates are shown in the format columns. It is apparent that the four formats place varying requirements on the system. For example in format #1, eight channels are sampled at the rate of 256 samples per second whereas in format #2, only four channels are sampled at 256 samples per second. All formats completely fill the 8192 word slots but they each have a different number of channels.

In order to design a system which would generate format #1, this could be done systematically by the method previously described. However, in order for the same system to be capable of generating multiple formats changes must be made.

Since, in our example, a frame consists of 8192 word slots, a word counter having 13 stages is necessary ($2^{13}=8192$). According to format #1, eight channels must occupy 512 slots each, eight channels must occupy 256 channels each, eight channels must occupy 128 channels, each, and so on. In order to accomplish this result, the eight channels at 512 samples per second must be assigned codes corresponding to states of the counter which occur 512 times for a complete count of 0 to 8,191. As an example, that code may be:

$$XX0X\phi\phi\phi\phi\phi\phi\phi\phi\phi$$

Thus, the decode gate for each of the eight channels would respond only to the first four stages (stages $Q_{11}$, $Q_{12}$, $Q_{13}$ and $Q_{14}$) of the word counter. The condition XX0X represents a total of eight unique combinations (eight channels), and because the nine highest order stages do not enter into control of the eight channels, each of the unique combinations occur 512 times ($2^9=512$). Three X's are needed to generate eight combinations but unlike the prior simple example, all X's are not placed in the remaining highest order stages. Instead, two X's are placed in the $Q_{11}$ and $Q_{12}$ stages respectively, thus insuring that four channels at the same sampling rate are in four sequential slots. As explained above, the four channels at the same rate in sequence are referred to as a quad. The remaining X's (if there are any) are assigned to the remaining unfilled highest order stages.

It should be noted that the grouping of four channels together is not a necessary feature of the invention. If it is desirable, no channels could be grouped, or two channels could be grouped by placing an X in the first stage, or three channels could be grouped by placing X's in the two lowest order stages and wiring them to recycle after the count of three, or other pluralities of channels may be grouped as desired.

The remaining channels are assigned codes in the same manner. However, in order to change formats, it is necessary that the word counter codes which describe some channels in one format describe different channels in another format. For example, assume we now want to generate Format #3. The changes to be made with respect to the first format are; *drop* 4 channels at 512 s.p.s., and 4 channels at 256 s.p.s. thereby leaving open 4,072 slots ($4\times512+4\times256=4072$), and *add* 8 channels at 64 s.p.s., 32 channels at 32 s.p.s., 56 channels at 16 s.p.s., 32 channels at 8 s.p.s., 32 channels at 4 s.p.s., 64 channels at 2 s.p.s., and 128 channels at 1 s.p.s., thereby filling the open 4072 slots $$(8\times64+32\times32+56\times16+32\times8+32\times4+64\times2+128\times1=4072)$$

We had previously assigned the code $$XX0X\phi\phi\phi\phi\phi\phi\phi\phi\phi$$

to the eight channels at 512 s.p.s. However, for format #3, we only need four of those channels. The code corresponding to the dropped channels can be used to correspond to some of the new channels.

A number of common changes can be made which will allow simplest logic for generating multiple formats. The first change, $C_1$, is

| | Add |
|---|---|
| Drop 4 channels at 512 s.p.s. | 8 channels at 128 s.p.s.<br>16 channels at 32 s.p.s.<br>32 channels at 16 s.p.s. |
| Change $C_2$: Drop 4 channels at 256 s.p.s. | 8 channels at 64 s.p.s.<br>32 channels at 16 s.p.s. |
| Change $C_3$: Drop 8 channels at 128 s.p.s. | 16 channels at 32 s.p.s.<br>32 channels at 8 s.p.s.<br>32 channels at 4 s.p.s.<br>64 channels at 2 s.p.s. |
| Change $C_4$: Drop 8 channels at 16 s.p.s. | 128 channels at 1 s.p.s. |

In each of the above changes, the number of slots left open by the dropped channels are filled by the added channels. The four changes, $C_1$–$C_4$, provide a total of 16 different formats as illustrated in FIGURE 3. The ones and zeroes in the upper part of the figure indicate that the corresponding change is made or not made, respectively.

Thus, for format #1, no changes are necessary. For format #2, changes $C_2$, $C_3$, and $C_4$ are necessary. For format #3, changes $C_1$, $C_2$, $C_3$ and $C_4$ are necessary. For format #4, changes $C_1$, $C_2$, and $C_4$ are necessary.

The states of the thirteen stages of the word counter assigned for the purpose of generating format #1 are shown in FIGURE 4. It should be remembered that the word counter counts from 0 to 8191 (8,192 unique combinations) and the assignment of the word counter states in the systematic manner determines the inputs to the decode gates for the several channels. The systematic method insures that (1) the decode gates for the particular channels will be energized the correct number of times during a frame, (2) the channels at the same rate are sampled four in a row resulting in quads, (3) the quads at the same sampling rate are uniformly separated, (4) format changes can be made by simple addition of logic circuitry, and (5) all possible word counter states are assigned to channels.

Referring to FIGURE 4, the terms $Q_{11}$–$Q_{19}$ and $Q_{110}$–$Q_{113}$ represent the thirteen stages of the word counter. The "F" terms are used merely to describe the adjacent states. The channels, their respective sampling rates and the channel numbers for format #1 are listed in the three columns on the right. The word slots (8,192) are apportioned to the 88 channels of format #1 in the following manner.

There are eight channels at 512 samples each per frame. In order to insure that the assigned codes occur 512 times per frame, the nine highest order stages are to be ignored in the decoding for these channels. Thus, $Q_{15}$–$Q_{19}$ and $Q_{110}$–$Q_{113}$ are assigned $\phi$'s ($2^9=512$). Any particular value of bits now assigned to the remaining four stages will occur 512 times per frame. Since there are four stages left to work with, we can control up to 16 channels at 512 samples per frame. However, eight channels are used and therefore three of the stages will be assigned X's, and the other a definite value. The first two X's are placed in stages $Q_{11}$ and $Q_{12}$, thereby insuring that four will occur in sequence. The remaining X is assigned to $Q_{14}$ thereby separating the quads. Stage $Q_{13}$ is assigned the value 0 arbitrarily.

Figure 5A:
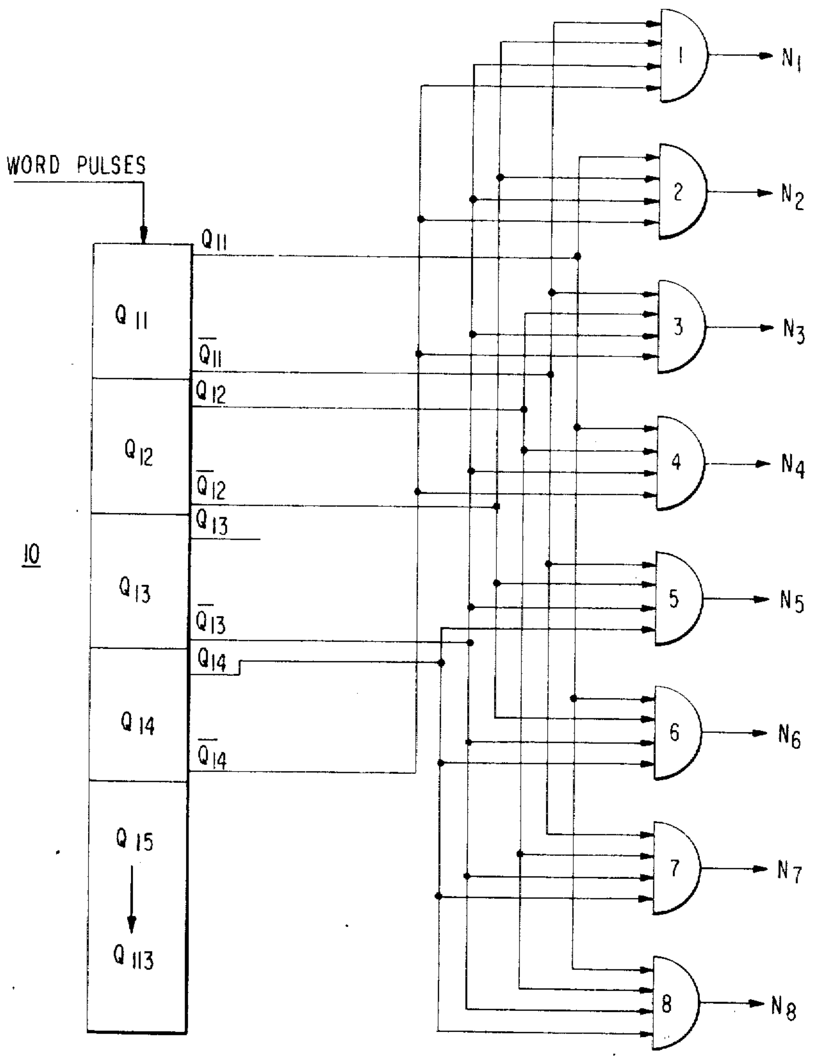
FIGURE 5A is a block diagram showing a preferred embodiment of the details of FIGURE 5.

FIGURES 5 and 5A illustrate the possible decode gates for the eight channels at 512 samples per second. According to accepted convention, a $Q_a$ input means an input from the "true" or "1" side of stage *a* and a $\overline{Q}_a$ input means an input from the "false" or "0" side of stage *a*. An $X_a$ input means either a 1 or 0 from stage *a*. FIG. 5 shows the logic only generally. FIG. 5A shows specific decode gates for the eight channels referred to as $N_1$–$N_8$.

This discussion concerns a design that would generate format #1 only. In a design which would generate other formats in addition to format #1, some format change signals (C's) would be included in the logical equations and logic diagrams.

The code $X_{11}X_{12}\overline{Q}_{13}X_{14}$ is capable of generating eight unique codes. The unique codes are:

(1) $\overline{Q}_{11}\,\overline{Q}_{12}\,\overline{Q}_{13}\,\overline{Q}_{14}$
(2) $Q_{11}\,\overline{Q}_{12}\,\overline{Q}_{13}\,\overline{Q}_{14}$
(3) $\overline{Q}_{11}\,Q_{12}\,\overline{Q}_{13}\,\overline{Q}_{14}$
(4) $Q_{11}\,Q_{12}\,\overline{Q}_{13}\,\overline{Q}_{14}$
(5) $\overline{Q}_{11}\,\overline{Q}_{12}\,\overline{Q}_{13}\,Q_{14}$
(6) $Q_{11}\,\overline{Q}_{12}\,\overline{Q}_{13}\,Q_{14}$
(7) $\overline{Q}_{11}\,Q_{12}\,\overline{Q}_{13}\,Q_{14}$
(8) $Q_{11}\,Q_{12}\,\overline{Q}_{13}\,Q_{14}$ The unique codes 1–8 above are applied to the decoding AND gates 1–8 respectively in FIG. 5A thereby generating outputs $N_1$–$N_8$ which sample the eight channels 512 times per frame. The inputs to the AND gates are from the word counter stages illustrated generally at 10. Since stages $Q_{16}$–$Q_{113}$ are assigned $\phi$'s, they do not enter into control of the eight channels.

The detailed discussion of the $F_1$ code in FIG. 4 was given in order to clarify the meaning of the terms of FIG. 4 and to particularly point out the function of the codes. The remainder of the expressions will not be discussed in such great detail.

Continuing with FIG. 4, we must next assign codes to eight channels at 256 samples per frame. The sample rate requires eight of the stages to be filled with $\phi$'s ($2^8=256$). Three X's are needed in the remaining five stages to generate eight channels ($2^3=8$). The first two X's are assigned to $Q_{11}$ and $Q_{12}$, and the third X is assigned to $Q_{15}$. The remaining stages, $Q_{13}$ and $Q_{14}$, must be assigned specific values. A "one" must be assigned to $Q_{13}$. Note that if a "zero" had been assigned to $Q_{13}$, some of the $F_1$ channels (8 at 512 rate) would occupy the same word slots as the $F_6$ channels (8 at 256), and that cannot be done. Thus, the assignment of a "one" to $Q_{13}$ prevents ambiguity between $F_1$ and $F_6$. A zero is arbitrarily assigned to $Q_{14}$.

The codes for $F_{10}$ through $F_{21}$ are assigned in the same manner as described for $F_1$ and $F_6$. Note that the one and zero bits are assigned so that there is no ambiguity between any of the expressions $F_1$–$F_{21}$. Thus, codes for all channels have been designated and the codes occur at rates so that a channel corresponding to a given code will be sampled at the correct rate.

Figure 6:
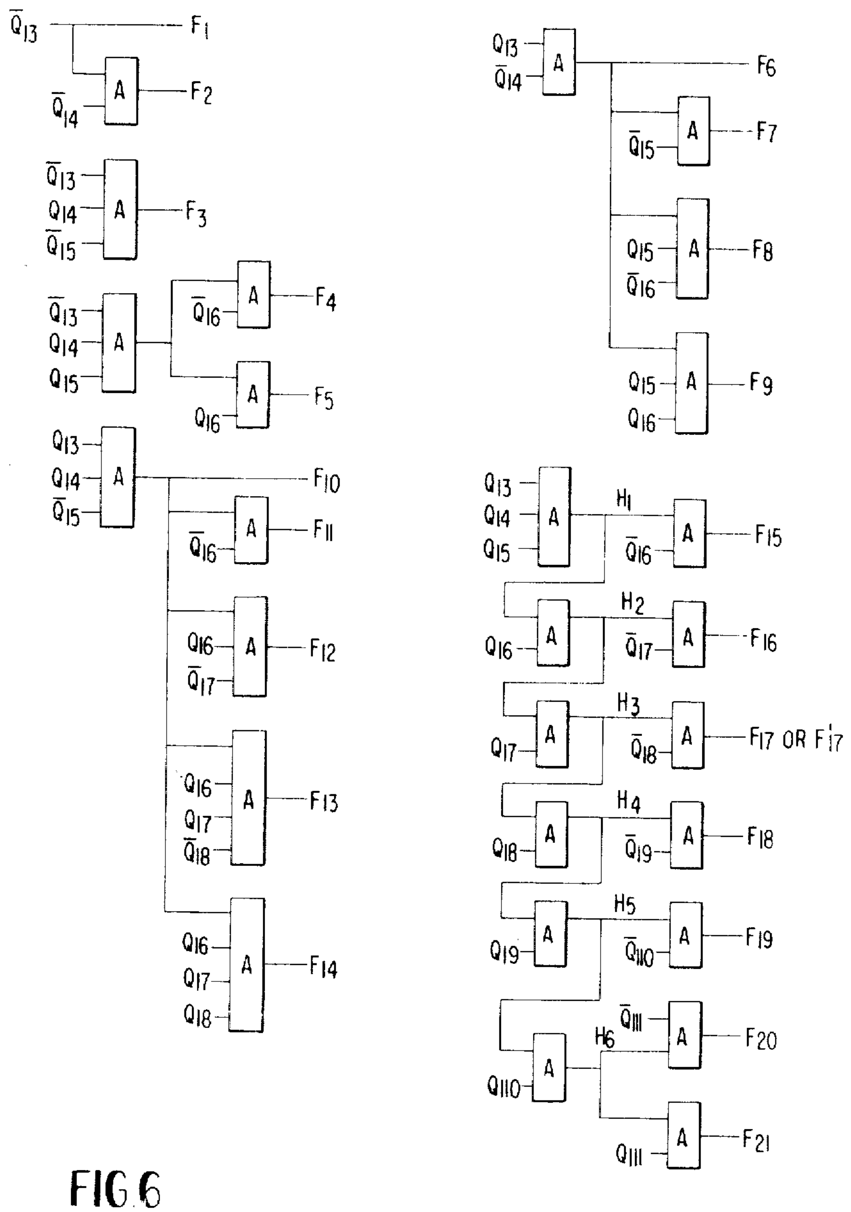

A general diagram of the logic for generating format #1 is illustrated in FIGURE 6. Note that only the F expressions are generated by the logic equation. Additional logic, along the lines as that shown in FIG. 5A, is used to break down the F expressions into the desired number of channels. For example, $F_1$, which exists every time $\overline{Q}_{13}$ occurs, is ANDed with the eight specific combinations possible from $X_{11}X_{12}X_{14}$ to produce $N_1$–$N_8$. The latter is shown in FIG. 5A.

Figures 7, 8:
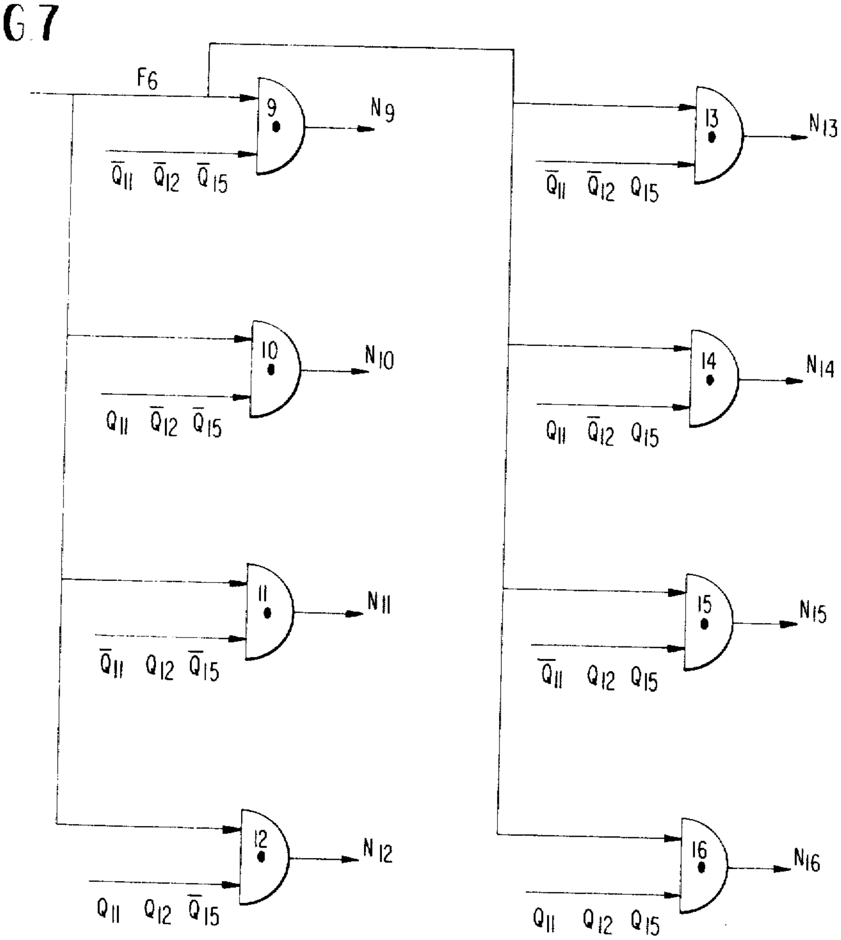
Figure 10:
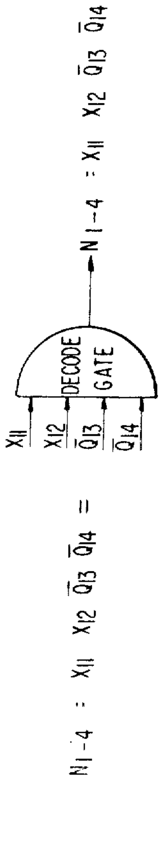
FIGURES 10–31 are diagrams of the decoding logic circuitry for the sources.
Figure 11:
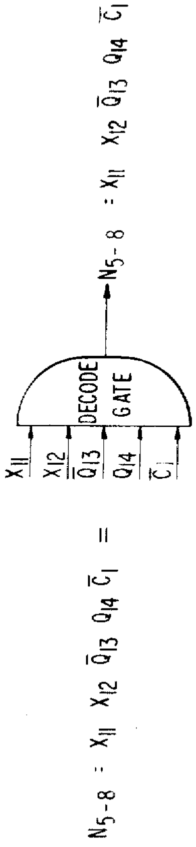

Also, $F_6$ exists whenever the expression $Q_{13}\overline{Q}_{14}$ occurs in the counter. The former expression is ANDed with the eight specific codes possible from $X_{11}X_{12}X_{15}$ to produce $N_9$–$N_{16}$, each of which occurs 256 times per frame. The logic for producing $N_9$–$N_{16}$ is shown in FIGURE 7. It will be apparent to those having ordinary skill in the art that the decoding scheme of FIG. 7 is the same as that for FIG. 5A except that in FIG. 5A all lead lines from the counter stages are illustrated whereas in FIG. 7 the lead lines are indicated only by way of a common form of expression. For example, the term $\overline{Q}_{11}\overline{Q}_{12}\overline{Q}_{15}$ on the input to gate $N_9$ is a shortened form of saying that inputs are applied to AND gate 9 from the $\overline{Q}_{11}$, $\overline{Q}_{12}$, and $\overline{Q}_{15}$ terminals of the word counter. The $F_6$ expression is common to all gates and, as seen in FIG. 6, is generated by the coincidence of $Q_{13}\overline{Q}_{14}$.

Logic capable of producing $N_{17}$–$N_{88}$ outputs from the $F_{10}$–$F_{21}$ expressions generated in FIG. 6, is apparent in view of the scheme shown in FIGURES 5A and 7, and the codes shown in FIGURE 4. Consequently, it is not deemed necessary to show the logic in a plurality of drawings. Instead, the logic circuitry for producing $N_{17}$–$N_{88}$ is given in the common expression form. Note that in the following, each expression represents an AND gate which produces an output when all of the terms on the right of the equal sign are applied to the inputs thereto.

$N_{17}=F_{10}\,\overline{Q}_{11}\,\overline{Q}_{12}\,\overline{Q}_{16}$
$N_{18}=F_{10}\,Q_{11}\,\overline{Q}_{12}\,\overline{Q}_{16}$
$N_{19}=F_{10}\,\overline{Q}_{11}\,Q_{12}\,\overline{Q}_{16}$
$N_{20}=F_{10}\,Q_{11}\,Q_{12}\,\overline{Q}_{16}$
$N_{21}=F_{10}\,\overline{Q}_{11}\,\overline{Q}_{12}\,Q_{16}$
$N_{22}=F_{10}\,Q_{11}\,\overline{Q}_{12}\,Q_{16}$
$N_{23}=F_{10}\,\overline{Q}_{11}\,Q_{12}\,Q_{16}$
$N_{24}=F_{10}\,Q_{11}\,Q_{12}\,Q_{16}$
$N_{25}=F_{15}\,\overline{Q}_{11}\,\overline{Q}_{12}\,\overline{Q}_{17}$
$N_{26}=F_{15}\,Q_{11}\,\overline{Q}_{12}\,\overline{Q}_{17}$
$N_{27}=F_{15}\,\overline{Q}_{11}\,Q_{12}\,\overline{Q}_{17}$
$N_{28}=F_{15}\,Q_{11}\,Q_{12}\,\overline{Q}_{17}$
$N_{29}=F_{15}\,\overline{Q}_{11}\,\overline{Q}_{12}\,Q_{17}$
$N_{30}=F_{15}\,Q_{11}\,\overline{Q}_{12}\,Q_{17}$
$N_{31}=F_{15}\,\overline{Q}_{11}\,Q_{12}\,Q_{17}$
$N_{32}=F_{15}\,Q_{11}\,Q_{12}\,Q_{17}$
$N_{33}=F_{16}\,\overline{Q}_{11}\,\overline{Q}_{12}\,\overline{Q}_{18}$
$N_{34}=F_{16}\,Q_{11}\,\overline{Q}_{12}\,\overline{Q}_{18}$
$N_{35}=F_{16}\,\overline{Q}_{11}\,Q_{12}\,\overline{Q}_{18}$
$N_{36}=F_{16}\,Q_{11}\,Q_{12}\,\overline{Q}_{18}$
$N_{37}=F_{16}\,\overline{Q}_{11}\,\overline{Q}_{12}\,Q_{18}$
$N_{38}=F_{16}\,Q_{11}\,\overline{Q}_{12}\,Q_{18}$
$N_{39}=F_{16}\,\overline{Q}_{11}\,Q_{12}\,Q_{18}$
$N_{40}=F_{16}\,Q_{11}\,Q_{12}\,Q_{18}$
$N_{41}=F_{17}\,\overline{Q}_{11}\,\overline{Q}_{12}\,\overline{Q}_{19}$
$N_{42}=F_{17}\,Q_{11}\,\overline{Q}_{12}\,\overline{Q}_{19}$
$N_{43}=F_{17}\,\overline{Q}_{11}\,Q_{12}\,\overline{Q}_{19}$
$N_{44}=F_{17}\,Q_{11}\,Q_{12}\,\overline{Q}_{19}$
$N_{45}=F_{17}\,\overline{Q}_{11}\,\overline{Q}_{12}\,Q_{19}$
$N_{46}=F_{17}\,Q_{11}\,\overline{Q}_{12}\,Q_{19}$
$N_{47}=F_{17}\,\overline{Q}_{11}\,Q_{12}\,Q_{19}$
$N_{48}=F_{17}\,Q_{11}\,Q_{12}\,Q_{19}$
$N_{49}=F_{18}\,\overline{Q}_{11}\,\overline{Q}_{12}\,\overline{Q}_{110}$
$N_{50}=F_{18}\,Q_{11}\,\overline{Q}_{12}\,\overline{Q}_{110}$ $N_{51}=F_{18}\,\overline{Q}_{11}\,Q_{12}\,\overline{Q}_{110}$
$N_{52}=F_{18}\,Q_{11}\,Q_{12}\,\overline{Q}_{110}$
$N_{53}=F_{18}\,\overline{Q}_{11}\,\overline{Q}_{12}\,Q_{110}$
$N_{54}=F_{18}\,Q_{11}\,\overline{Q}_{12}\,Q_{110}$
$N_{55}=F_{18}\,\overline{Q}_{11}\,Q_{12}\,Q_{110}$
$N_{56}=F_{18}\,Q_{11}\,Q_{12}\,Q_{110}$
$N_{57}=F_{19}\,\overline{Q}_{11}\,\overline{Q}_{12}\,\overline{Q}_{111}$
$N_{58}=F_{19}\,Q_{11}\,\overline{Q}_{12}\,\overline{Q}_{111}$
$N_{59}=F_{19}\,\overline{Q}_{11}\,Q_{12}\,\overline{Q}_{111}$
$N_{60}=F_{19}\,Q_{11}\,Q_{12}\,\overline{Q}_{111}$
$N_{61}=F_{19}\,\overline{Q}_{11}\,\overline{Q}_{12}\,Q_{111}$
$N_{62}=F_{19}\,Q_{11}\,\overline{Q}_{12}\,Q_{111}$
$N_{63}=F_{19}\,\overline{Q}_{11}\,Q_{12}\,Q_{111}$
$N_{64}=F_{19}\,Q_{11}\,Q_{12}\,Q_{111}$
$N_{65}=F_{20}\,\overline{Q}_{11}\,\overline{Q}_{12}\,\overline{Q}_{112}$
$N_{66}=F_{20}\,Q_{11}\,\overline{Q}_{12}\,\overline{Q}_{112}$
$N_{67}=F_{20}\,\overline{Q}_{11}\,Q_{12}\,\overline{Q}_{112}$
$N_{68}=F_{20}\,Q_{11}\,Q_{12}\,\overline{Q}_{112}$
$N_{69}=F_{20}\,\overline{Q}_{11}\,\overline{Q}_{12}\,Q_{112}$
$N_{70}=F_{20}\,Q_{11}\,\overline{Q}_{12}\,Q_{112}$
$N_{71}=F_{20}\,\overline{Q}_{11}\,Q_{12}\,Q_{112}$
$N_{72}=F_{20}\,Q_{11}\,Q_{12}\,Q_{112}$
$N_{73}=F_{21}\,\overline{Q}_{11}\,\overline{Q}_{12}\,\overline{Q}_{112}\,\overline{Q}_{113}$
$N_{74}=F_{21}\,Q_{11}\,\overline{Q}_{12}\,\overline{Q}_{112}\,\overline{Q}_{113}$
$N_{75}=F_{21}\,\overline{Q}_{11}\,Q_{12}\,\overline{Q}_{112}\,\overline{Q}_{113}$
$N_{76}=F_{21}\,Q_{11}\,Q_{12}\,\overline{Q}_{112}\,\overline{Q}_{113}$
$N_{77}=F_{21}\,\overline{Q}_{11}\,\overline{Q}_{12}\,Q_{112}\,\overline{Q}_{113}$
$N_{78}=F_{21}\,Q_{11}\,\overline{Q}_{12}\,Q_{112}\,\overline{Q}_{113}$
$N_{79}=F_{21}\,\overline{Q}_{11}\,Q_{12}\,Q_{112}\,\overline{Q}_{113}$
$N_{80}=F_{21}\,Q_{11}\,Q_{12}\,Q_{112}\,\overline{Q}_{113}$
$N_{81}=F_{21}\,\overline{Q}_{11}\,\overline{Q}_{12}\,\overline{Q}_{112}\,Q_{113}$
$N_{82}=F_{21}\,Q_{11}\,\overline{Q}_{12}\,\overline{Q}_{112}\,Q_{113}$
$N_{83}=F_{21}\,\overline{Q}_{11}\,Q_{12}\,\overline{Q}_{112}\,Q_{113}$
$N_{84}=F_{21}\,Q_{11}\,Q_{12}\,\overline{Q}_{112}\,Q_{113}$
$N_{85}=F_{21}\,\overline{Q}_{11}\,\overline{Q}_{12}\,Q_{112}\,Q_{113}$
$N_{86}=F_{21}\,Q_{11}\,\overline{Q}_{12}\,Q_{112}\,Q_{113}$
$N_{87}=F_{21}\,\overline{Q}_{11}\,Q_{12}\,Q_{112}\,Q_{113}$
$N_{88}=F_{21}\,Q_{11}\,Q_{12}\,Q_{112}\,Q_{117}$ The logic shown and described thus far generates completely format #1. The word counter 10 of FIG. 5A receives word pulses at the rate of 8,192 pulses per second and counts from 0 to 8191 in one second generating a frame per second. The logic circuitry responsive to the states of the counter stages produces outputs $N_1$–$N_8$ 512 times per second, $N_9$–$N_{16}$ 256 times per second, etc. Each output $N_1$–$N_{88}$ is capable of sampling one of the 88 sources.

The above discussion related to format #1; however, format changes can be accomplished by utilizing various combinations of the $C_1$ through $C_4$ changes illustrated in FIGURE 3. The first change $C_1$ is to drop four of the channels at 512 samples per second and add 8 channels at 128 s.p.s., 16 channels at 32 s.p.s. and 32 channels at 16 s.p.s. The change is accomplished by assigning the code formerly used for the dropped channels to the new channels.

FIGURE 8 shows the reassignment of the codes for change $C_1$. Since four channels are to be dropped, only four channels at 512 s.p.s. will remain. The channels dropped are channels 5–8. $F_1$ is no longer of use when change $C_1$ is desired and therefore the time slots are apportioned to the dropped channels by the $F_1$ expression can be apportioned to the added channels by new expressions. Since $F_1$ is not to be used, a new expression is needed for the remaining four channels at 512 s.p.s. That expression is $F_2$. Note that $F_2$ has 9 $\phi$'s resulting in a sampling rate of $2^9$ or 512 s.p.s. Only two X's are in $F_2$ because only four channels need be accommodated. A zero is assigned to $Q_{13}$ in order to insure that the slots used for the $F_1$ channels are now used for the $F_2$ through $F_5$ channels. A zero is arbitrarily assigned to $Q_{14}$ for the $F_2$ channels. The remaining channels are assigned expressions according to the manner described above. It should be noted that expressions $F_2$–$F_5$ are not ambiguous with any of the expressions shown in FIGURE 4 with the exception of $F_1$. However, the latter ambiguity is necessary to insure that the added channels occupy the slots made available by eliminating the dropped channels for change $C_1$. Logic circuitry for generating expressions $F_2$–$F_5$ is shown in FIGURE 6, as described above.

The other changes $C_2$–$C_4$ are made in the same manner and all F expressions for format #1 and for changes $C_1$–$C_4$ are shown together in FIG. 9. Note that for change $C_1$, $F_1$ is not used, but $F_2$–$F_5$ are used. For change $C_2$, $F_6$ is not used but $F_7$–$F_9$ are used. For change $C_3$, $F_{10}$ is not used but $F_{11}$–$F_{14}$ are used. For change $C_4$, $F_{17}$ is not used but $F'_{17}$ is used. In the logic circuitry, input leads, designated as $C_1$, $C_2$, $C_3$ and $C_4$ respectively are used as gating inputs. When a voltage is applied to leads $C_2$, $C_3$ and $C_4$, making these functions "true," format #2 will be generated. When a voltage is applied to $C_1$, $C_2$, $C_3$ and $C_4$, format #3 will be generated. When a voltage is applied to leads $C_1$, $C_2$ and $C_4$, format #4 will be generated. When no voltage is applied to the leads $C_1$–$C_4$, format #1 will be generated.

A general block diagram of a system for generating the multiple formats is illustrated in FIGURE 9A, wherein a bit counter 50 receives bit pulses at the bit rate and provides word pulses to a word counter 52. In the specific example, word pulses occur at a rate of 8,192 p.p.s., therefore cycling the word counter once every second. If it is assumed that there are eight bits per word, the bit counter 50 could be a three-stage binary counter and the bit rate would be 65.536 kilobits per second.

The output leads, Q and $\overline{Q}$, from each of the word counter stages are connected to the decode logic 54. Also, inputs $C_1$ through $C_4$ are applied to the decode logic for use as gating signals. The output leads, channels $N_1$ through $N_{456}$, may be connected to sample 456 different sources.

An example of one embodiment of the decode and logic circuit 54 is shown in FIGS. 10–31. The gates shown have inputs in accordance with the chart shown in FIGURE 9. Since there are 456 channels and thus 456 decode AND gates in the particular embodiment, the channels are grouped together in accordance with the grouping shown in FIG. 9.

Each decode gate in FIGS. 10–31 represents a plurality of AND gates. The number of AND gates in all cases is equal in number to the number of channel outputs indicated by the subscript to the N output. For example in FIG. 12, the decode gate is actually eight decode AND gates. Each AND gate has applied thereto all of the Q, $\overline{Q}$, and C terms listed in the input expressions for the decode gates. Furthermore, each of the AND gates has applied thereto a different one of the possible combinations available from the X stages listed in the input expressions.

The significance of the symbols used in FIGS. 10–32 will be apparent to anyone having ordinary skill in the art of logic design. However, one of the symbols is shown in more detailed form in FIGURE 32.

Figure 12:
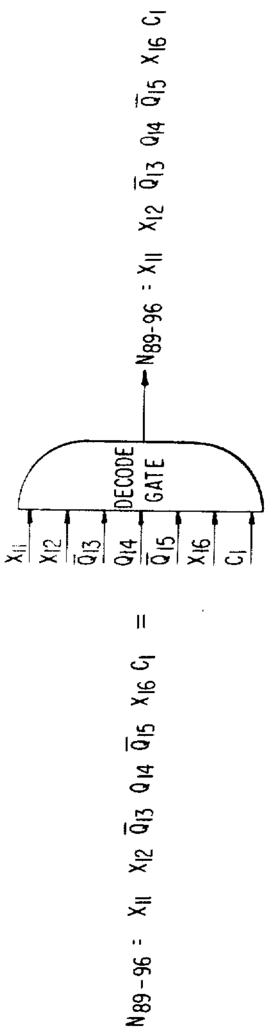
Figure 13:
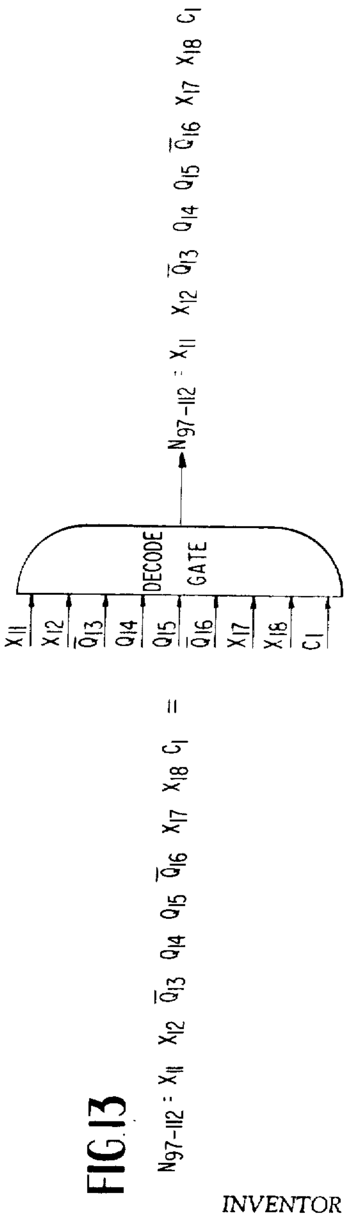
Figure 14:
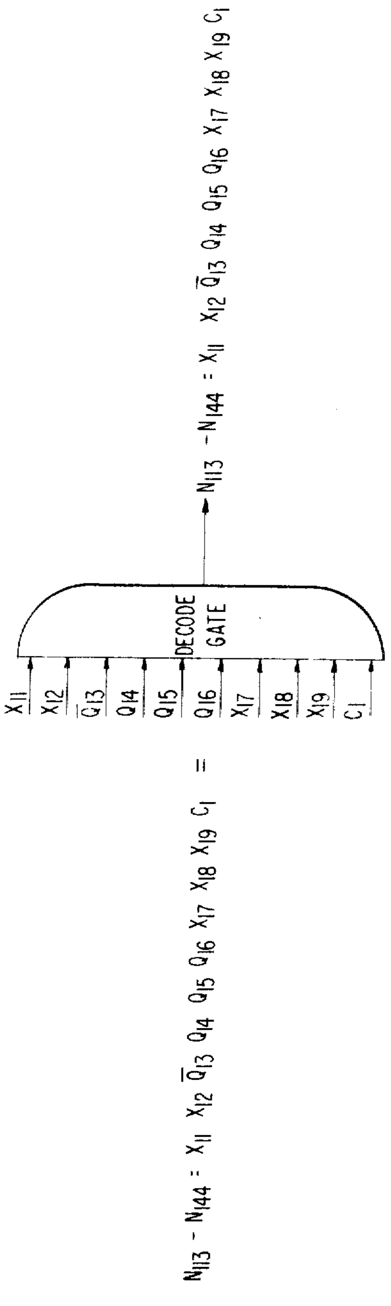
Figure 15:
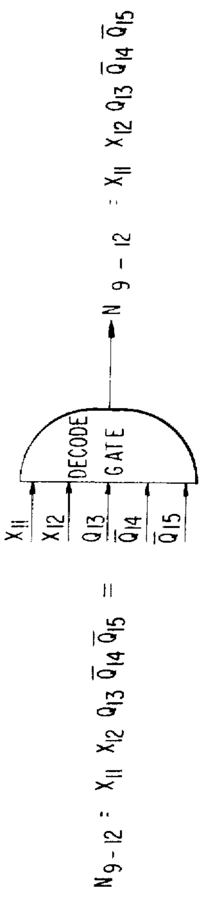
Figure 16:
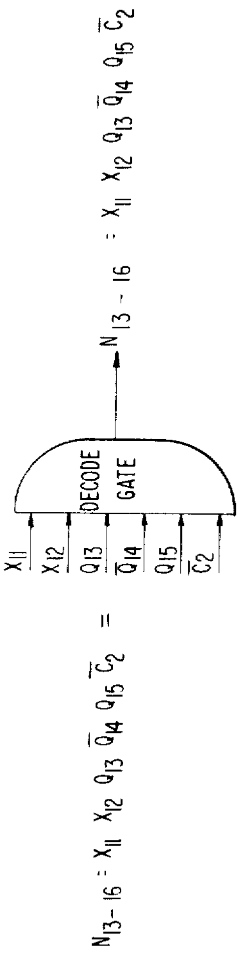
Figure 17:
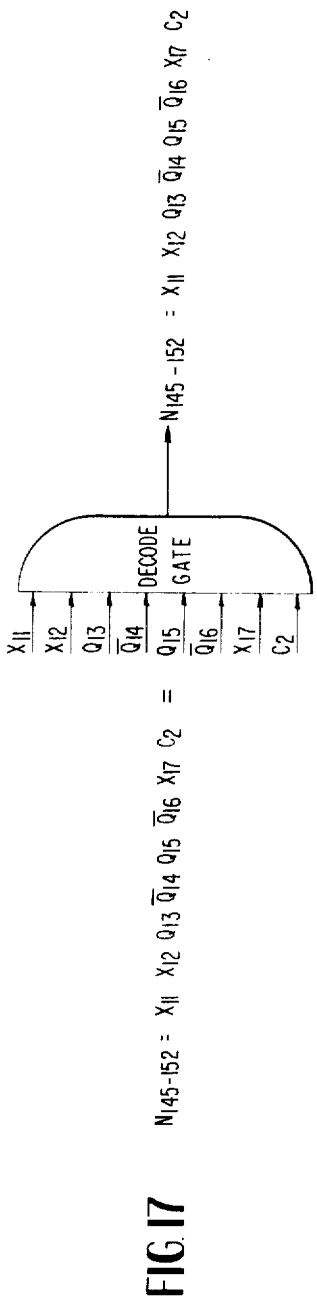
Figure 18:
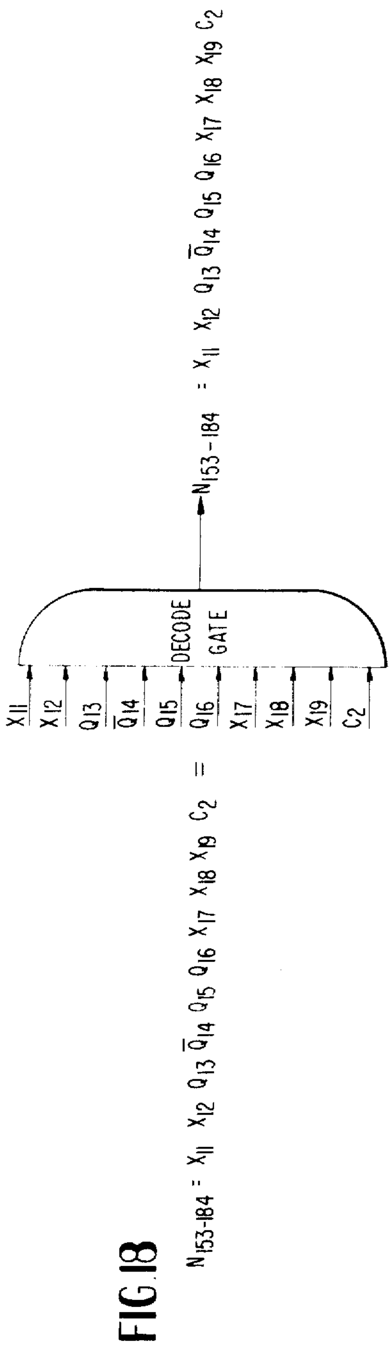
Figure 19:
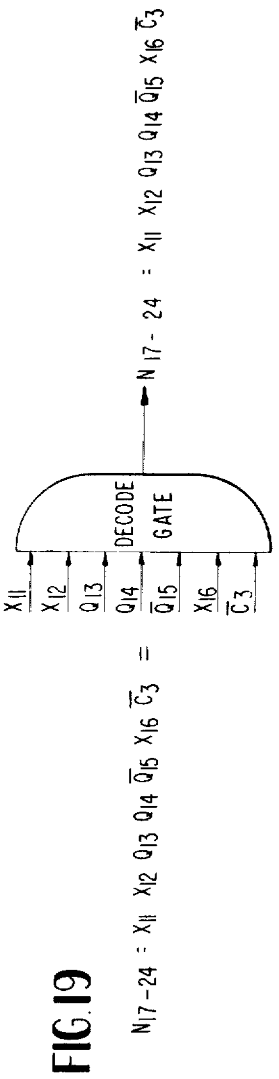
Figure 20:
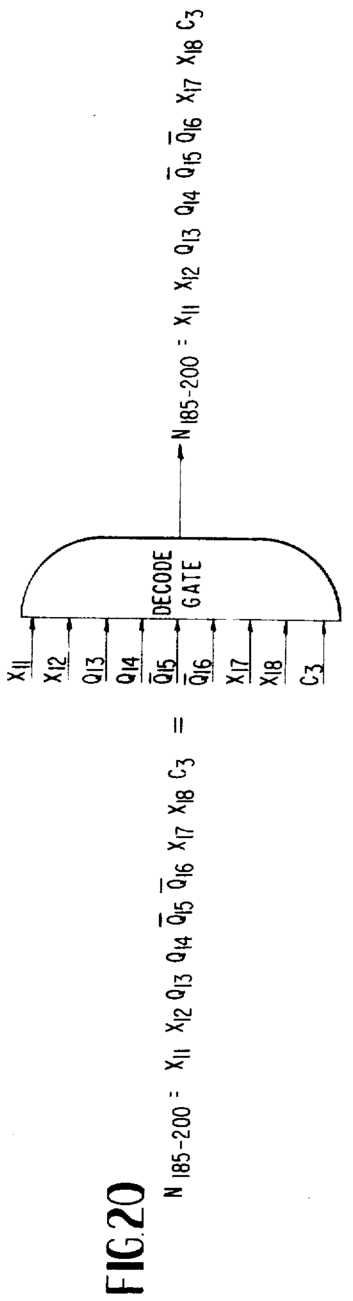
Figure 21:
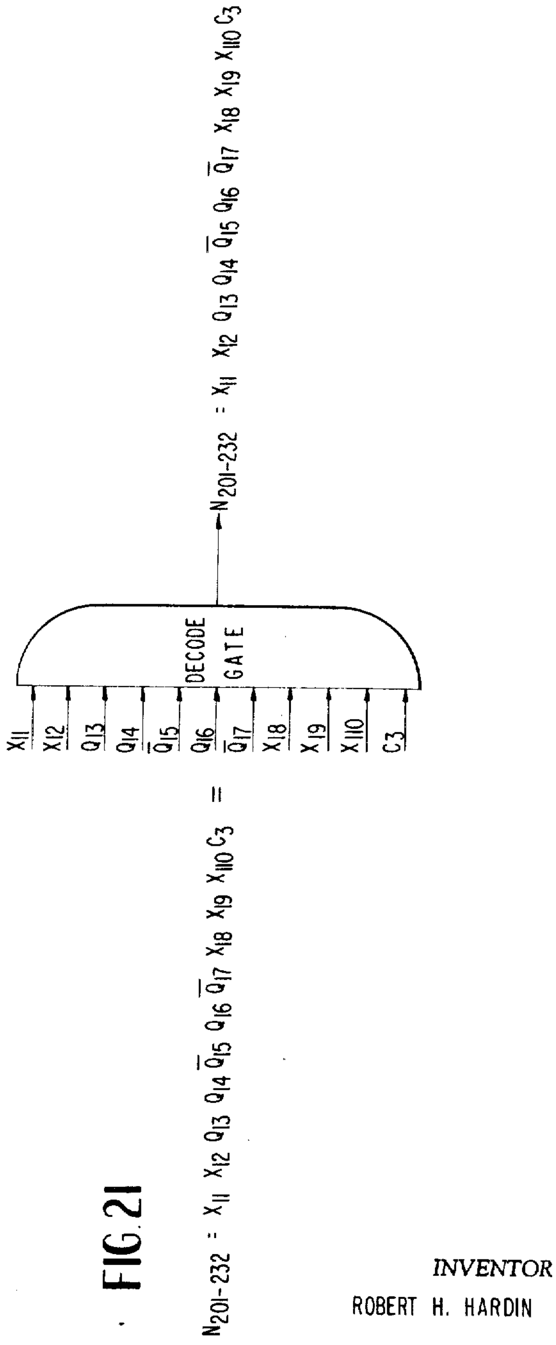
Figure 22:
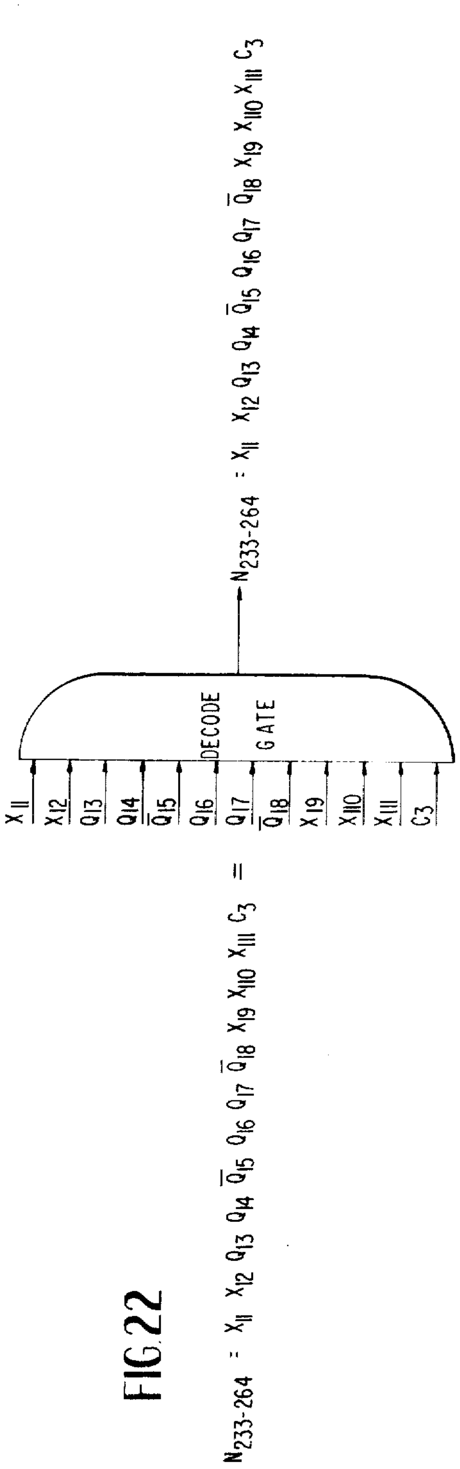
Figure 23:
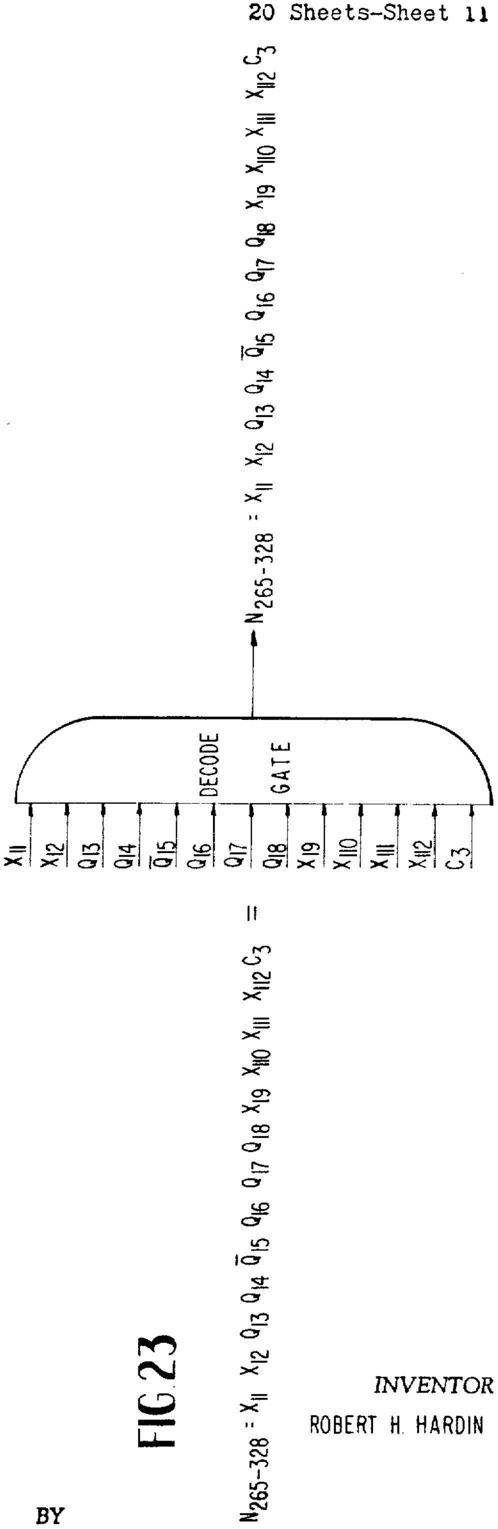
Figure 24:
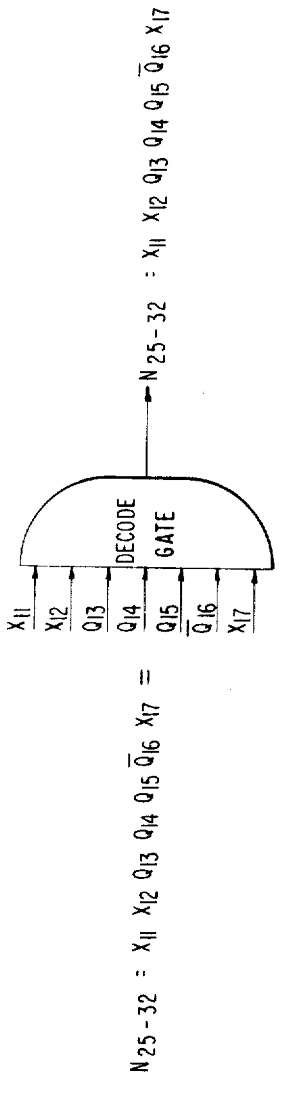
Figure 25:
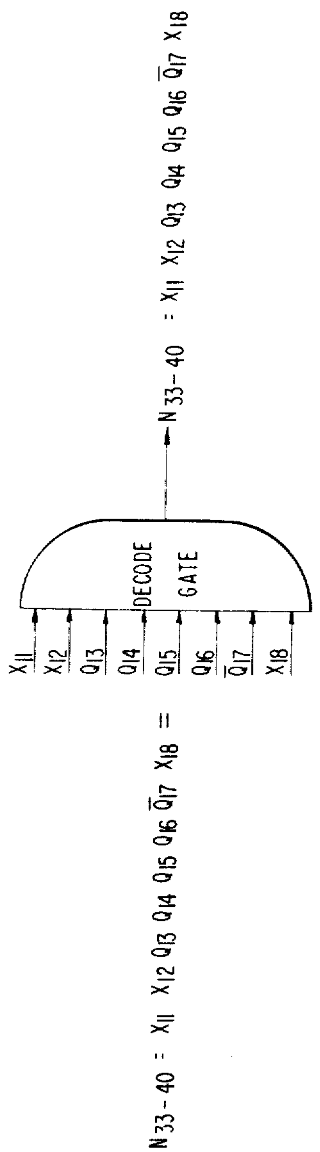
Figure 26:
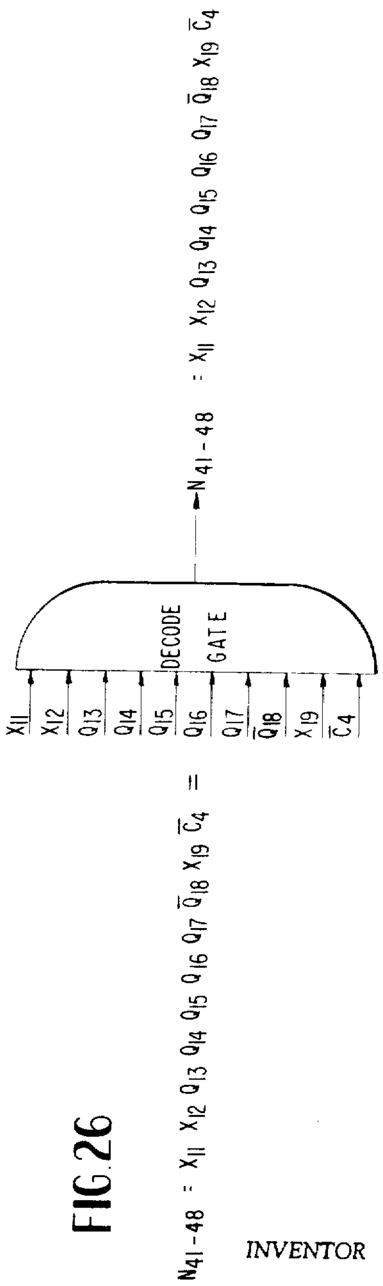
Figure 27:
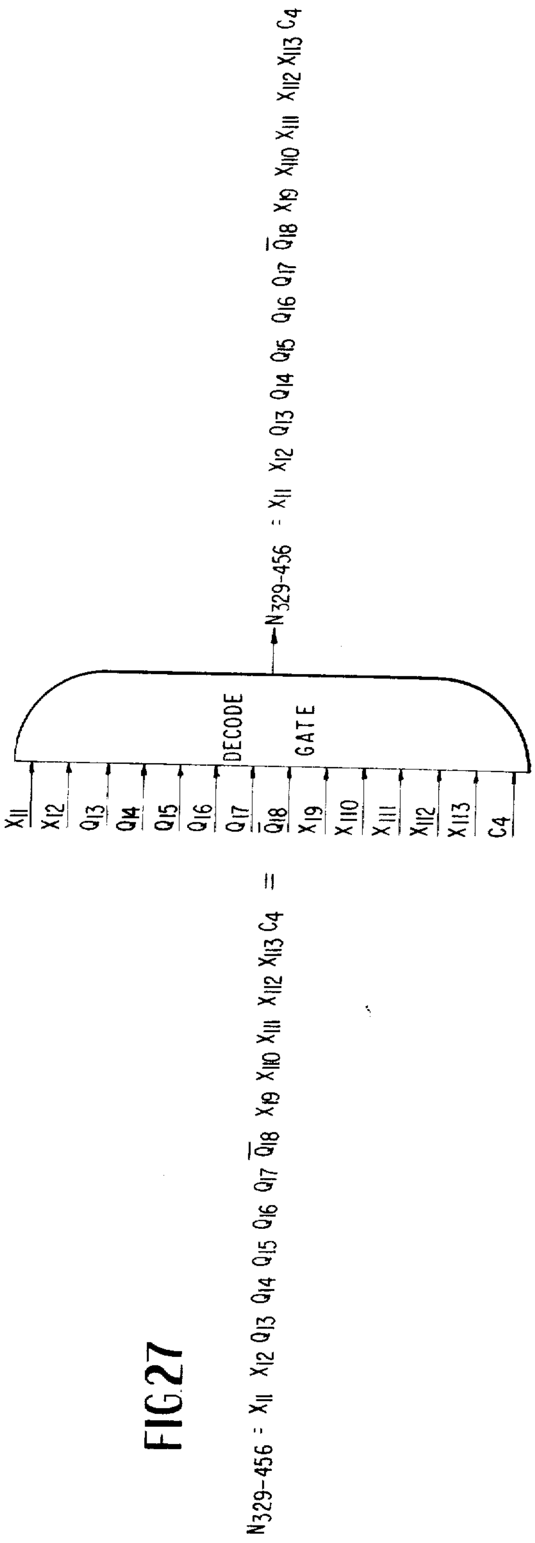
Figure 28:
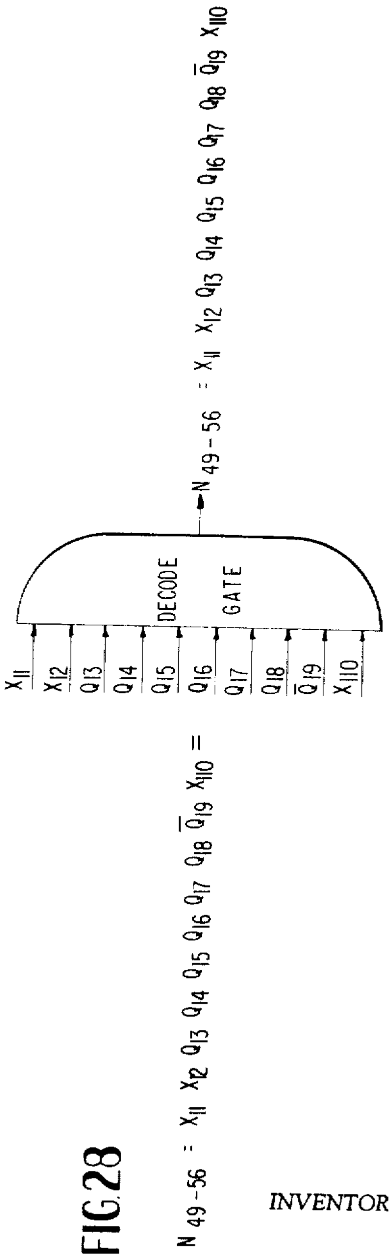
Figure 29:
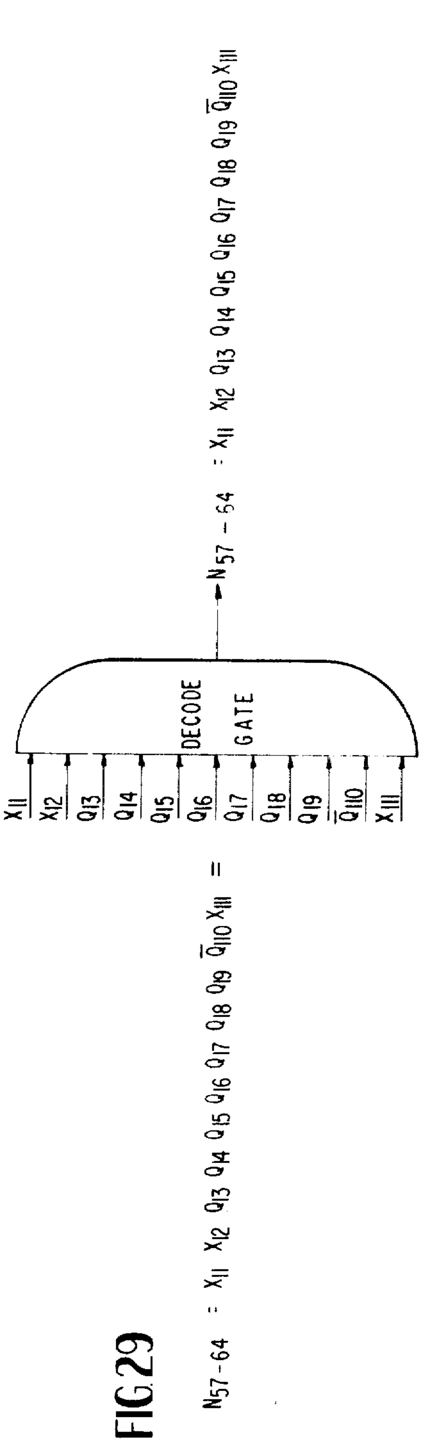
Figure 30:
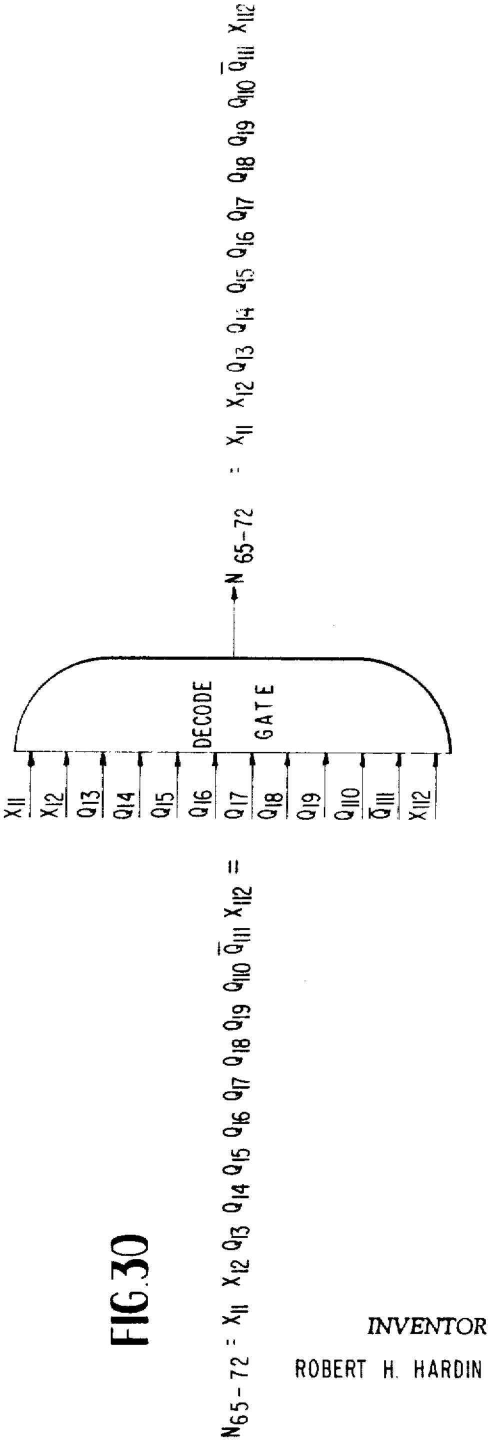
Figure 31:
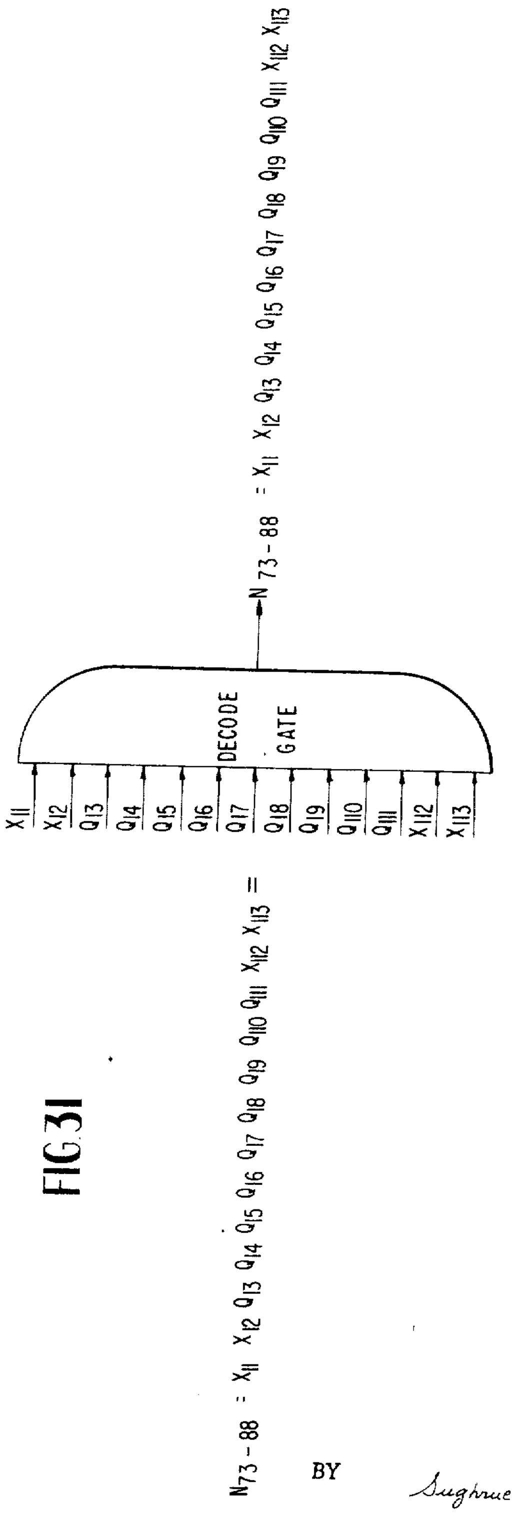
Figure 32:
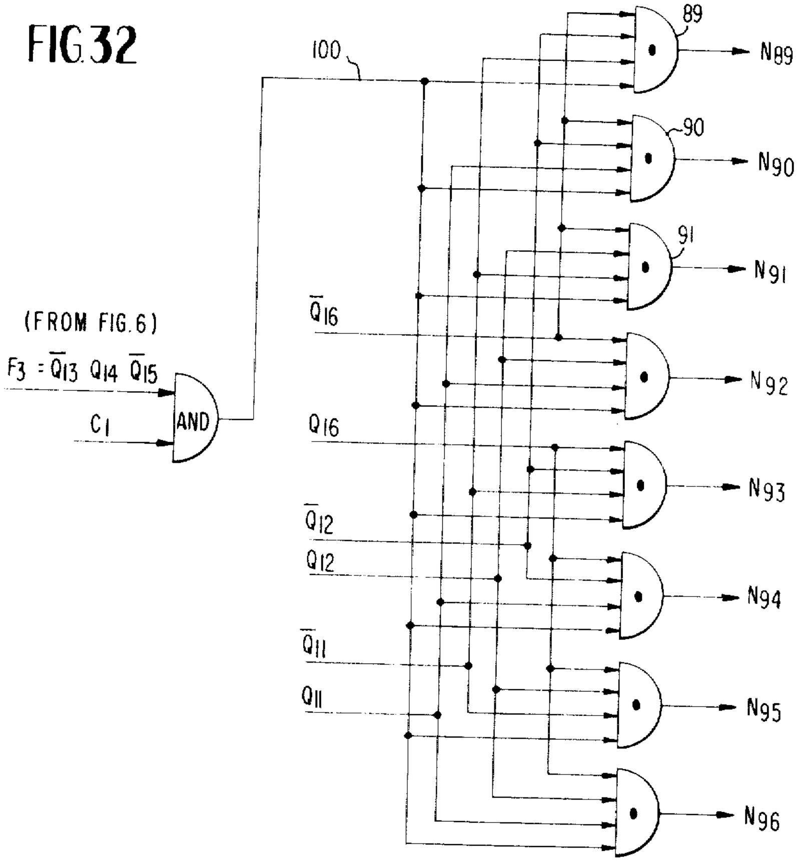
FIGURE 32 is a detailed block diagram helpful in understanding the logic circuitry of FIGURES 10–31.

FIGURE 32 illustrates all of the details of the decode gate of FIGURE 12. Each of decode AND gates 89–96 has applied thereto inputs from $\overline{Q}_{13}Q_{14}\overline{Q}_{15}$ and $C_1$ via lead 100. Each decode AND gate also receives one of the codes of the eight possible available from the expression $X_{11}X_{12}X_{16}$. Gate 89 receives inputs $\overline{Q}_{11}\overline{Q}_{12}\overline{Q}_{16}$, gate 90 receives $Q_{11}\overline{Q}_{12}\overline{Q}_{16}$, gate 91 receives $\overline{Q}_{11}Q_{12}\overline{Q}_{16}$, gate 92 receives $Q_{11}Q_{12}\overline{Q}_{16}$, gate 93 receives $\overline{Q}_{11}\overline{Q}_{12}Q_{16}$, gate 94 receives $Q_{11}\overline{Q}_{12}Q_{16}$, gate 95 receives $\overline{Q}_{11}Q_{12}Q_{16}$, and gate 96 receives $Q_{11}Q_{12}Q_{16}$. The gates provide outputs $N_{89}$ through $N_{96}$ respectively, each of which occurs 128 times per frame when an input voltage is applied to the $C_1$ lead. Note that in the absence of a voltage on the $C_1$ lead, there are no outputs on $N_{89}$ through $N_{96}$ for the entire frame.

Thus far, the system shown is capable of generating a plurality of different formats by providing outputs in desired sequences on a plurality of channel lines. If the format generator is used in telemetry systems, the channel lines may be used to sample the sources.

Often, it is necessary to transmit addresses to remote positions on a single line, allowing the individual sources to respond to their assigned addresses in a well-known manner. The present invention has the capability of single line addressing. The specific example given herein of single line addressing includes the same assumptions as made for the multiple line system described above. Thus, the same formats are to be generated at the same rates and the same word counter and word counter codes are used.

Figure 33:
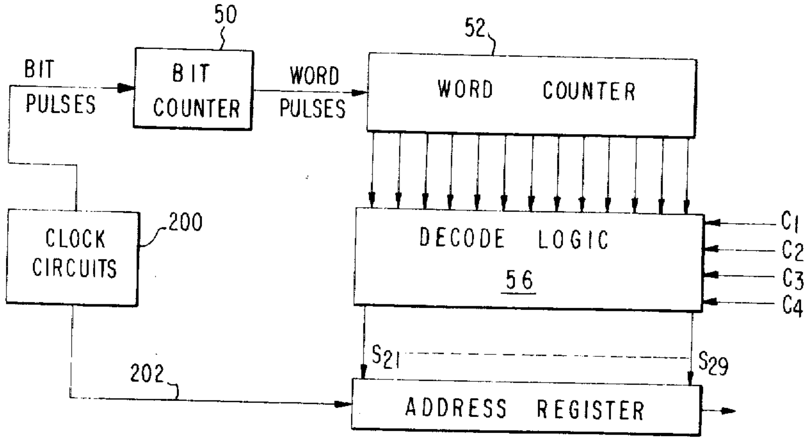
FIGURE 33 is a block diagram of another embodiment of the present invention.
Figure 35:
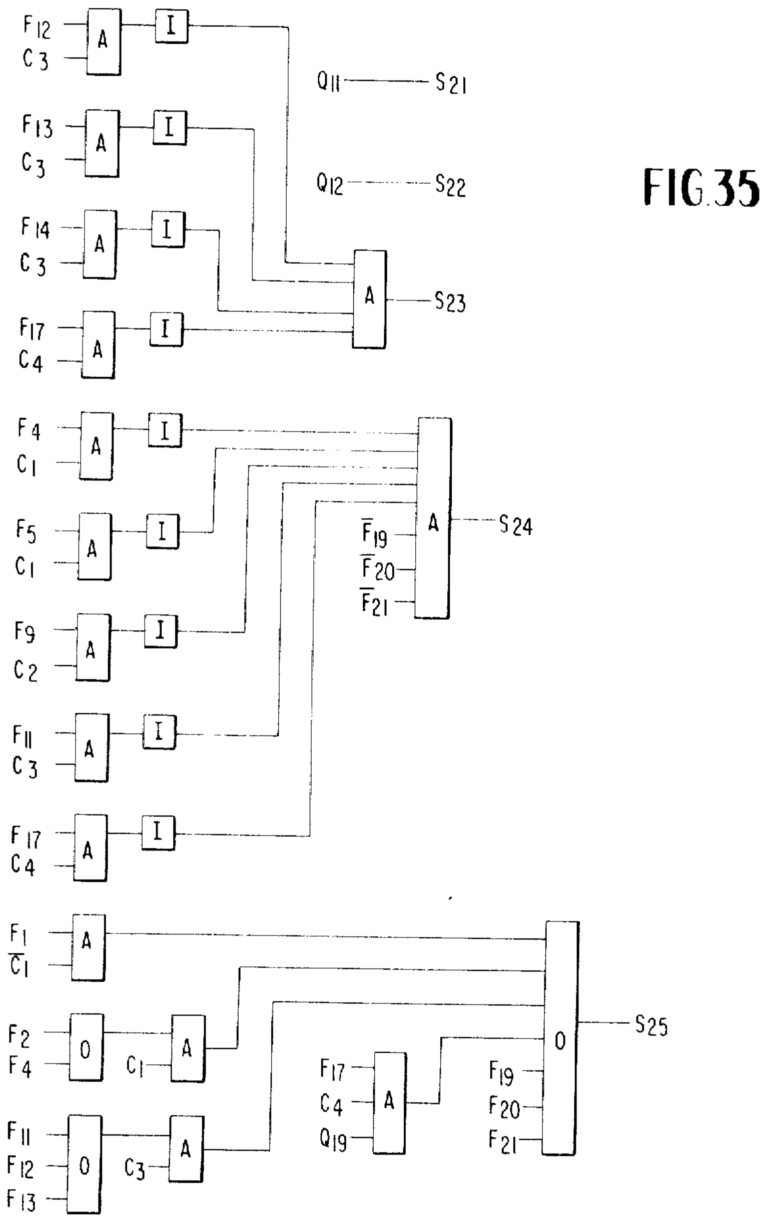
Figure 36:
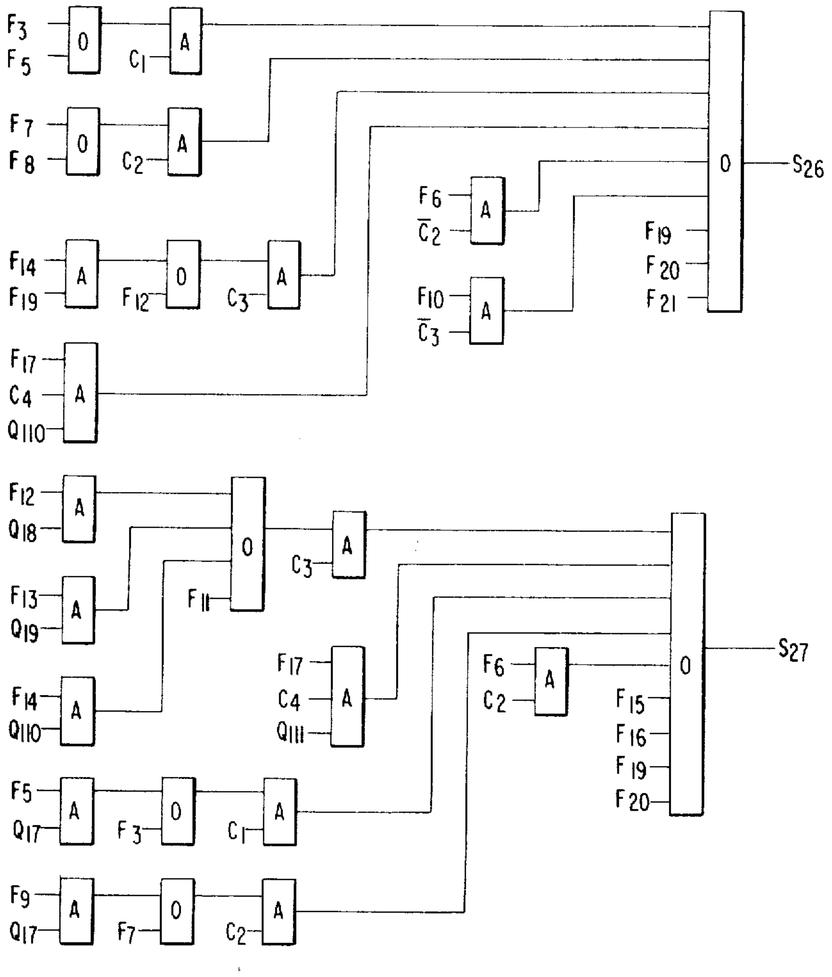
Figure 38:
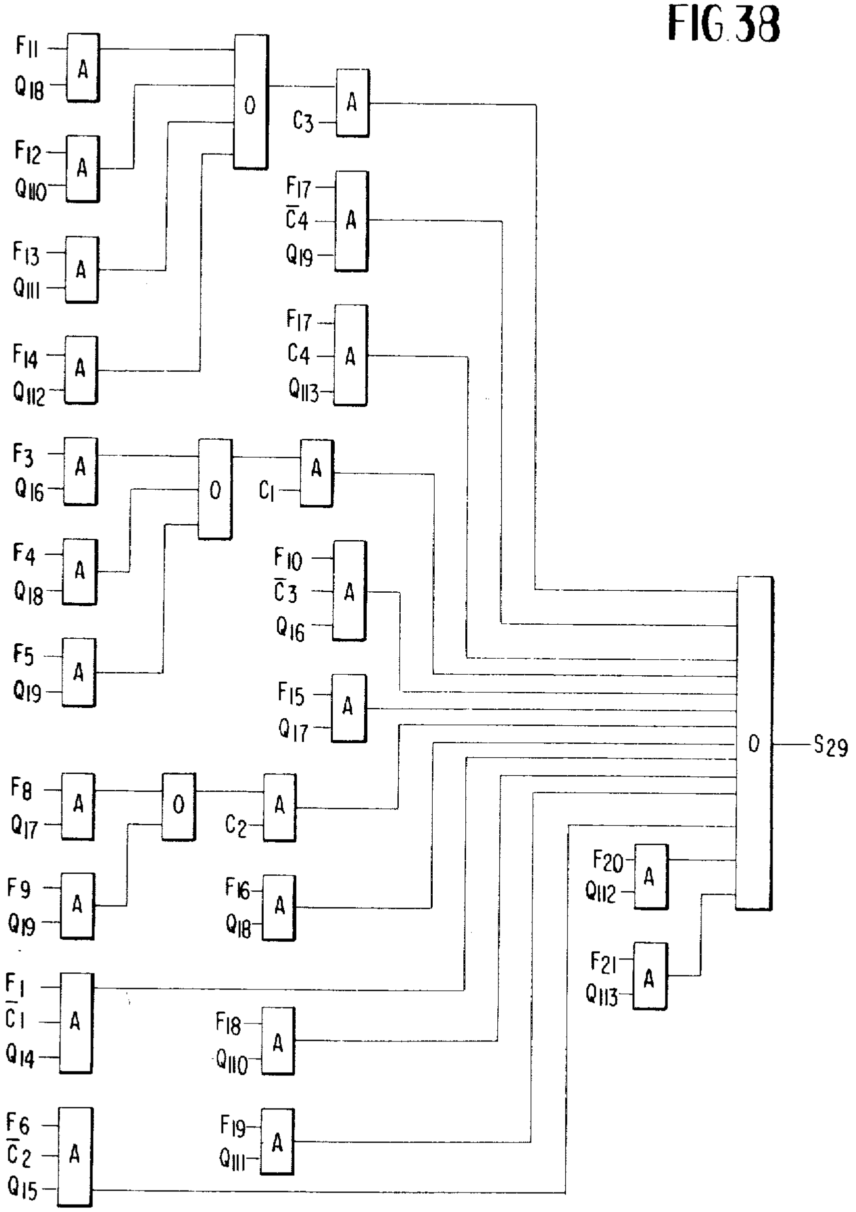

The single line addressing format generator is illustrated generally in FIG. 33. Bit counter 50 and word counter 52 are the same as in FIG. 10. Since there are a total of 456 sources in the example, the address register must have at least nine stages. Nine register stages provide 512 unique combinations, 456 of which will be used as addresses for the 456 sources. A decode logic circuit 56 receives inputs from the word counter stages and from leads $C_1$–$C_4$, and provides output pulses on leads $S_{21}$–$S_{29}$ which are adapted to set address register stages $Q_{21}$–$Q_{29}$ respectively. The function of decode logic 56 is to convert the state of counter 52 into a suitable address, dependent upon format controlling inputs $C_1$–$C_4$. The address is then transmitted to remote locations in response to the address clock rate pulses from the clock circuits 200 applied over connection 202. The frequency of the clock pulses on line 202 depends upon the length of a word and the number of bits in the address, i.e., enough clock pulses must occur during a single word time to shift out the entire contents of the address register. The clock circuits also provide the bit rate pulses to the bit counter which recycles and provides a word pulse output every time a predetermined number of bits is received.

As the addresses are transmitted from the address register, the stages of the address register are automatically cleared (reset to 0). Therefore, to transfer a new address into the address register it is only necessary to set those stages which should contain a "one" in the new address.

In order to simplify the logic circuitry necessary to generate the correct addresses, the various channels are assigned nine bit addresses in dependence upon the word counter code assignment of FIGURE 9. Referring back to FIGURE 9, it is remembered that the channels were assigned specific codes corresponding to specific states of the word counter. Most of the assigned codes did not include all stages of the word counter, and the codes assigned to the channels occurred at a rate necessary to insure the proper sampling rates of the channels.

Unlike the word counter, the address register is not a counter which advances one count for each input pulse. Instead, pulses may be applied to all of the SET inputs of the address register. Also, all stages of the register enter into the addresses for all channels; there are no "don't care" stages.

In assigning addresses, the following correspondence between the code words and the addresses are used. First, the counter states which determine the quad-channels, i.e., $Q_{11}$ and $Q_{12}$, are transferred directly to $Q_{21}$ and $Q_{22}$ of the nine stage address register, for all cases. Then the largest group of channels, all at the same sampling rate, is selected. In the specific example, the $F'_{17}$ channels are the largest group at any one sampling rate (128 at 1 s.p.s.). The X's in the counter stages $Q_{19}$–$Q_{113}$ are transferred to the most significant places in the address register, $Q_{25}$–$Q_{29}$. The latter is shown for $F'_{17}$ in the first row of FIG. 34. The columns $Q_{21}$–$Q_{29}$ represent the nine stages of the address register. Comparing FIG. 9 with FIG. 34, it can be seen that for $F'_{17}$, channels, the X's in $Q_{11}$ and $Q_{12}$ of the word counter are placed directly into stages $Q_{21}$ and $Q_{22}$, respectively, of the address register. The remaining five X's in the word counter code are placed in stages $Q_{25}$–$Q_{29}$ respectively. Thus, the addresses for 128 of the channels which are to be sampled one time each full cycle of the word counter, have been determined. The zeroes assigned to $Q_{23}$ and $Q_{24}$ are arbitrary, but it should be noted that ambiguity of addresses for the channels is avoided by assignment of different zero and one combinations to the different groups of channels. FIGURE 34 shows the nine bit addresses for all groups of channels. It will be obvious to those skilled in the art that the X's in the address for any group takes on different combinations for addressing the individual channels in that group. For example, the XX00XXXXX address for the $F'_{17}$ channels, 128 in all, at 1 s.p.s., contains 128 unique addresses for the 128 channels.

It should be noted that the addresses for the 4 channels at 512 s.p.s., ($F_2$), with change $C_1$, are the same as 4 of the addresses for the 8 channels at 512 s.p.s. ($F_1$) without change $C_1$. Thus, when change $C_1$ is made, 4 of the 8 channels at 512 s.p.s. continue to be addressed; the other 4 channels are dropped and 56 new channels are picked up. A similar situation applies to change $C_2$, but with changes $C_3$ and $C_4$, all the old channels are dropped and all new channels are picked up.

A preferred embodiment of the logic circuitry which makes up decode logic 56 is illustrated in FIGURES 35–38. The S terms indicate that the lead lines are applied to the SET inputs of the numbered address register stage (e.g., $S_{21}$ is applied to the SET input of stage $Q_{21}$ of the address register). The F terms are generated by the logic circuitry shown in FIGURE 6, which also is part of decode logic 56 of FIGURE 10. In FIGURES 35–38, the blocks labeled A represent AND gates, and the blocks labeled O represent OR gates. The blocks labeled I represent "NOT" or "INVERT" gates. The latter respond to a zero or one input to provide a one or zero output respectively.

The logical SET equations which are implemented by the logic circuitry of FIGURES 35–38 are given below. As is well-known in the art, a + symbol represents the logical OR function, a bar over an expression represents the logical "NOT" function, and the positioning of expressions next to one another without an intervening symbol represents the logical AND function.

$$S_{21}=Q_{11}$$
$$S_{22}=Q_{12}$$
$$S_{23}=\overline{F_{12}C_3}\,\overline{F_{13}C_3}\,\overline{F_{14}C_3}\,\overline{F_{17}C_4}$$
$$S_{24}=(\overline{F_4C_1})(\overline{F_5C_1})(\overline{F_9C_2})(\overline{F_{11}C_3})(\overline{F_{17}C_4})\overline{F}_{19}\overline{F}_{20}\overline{F}_{21}$$
$$S_{25}=F_1\overline{C}_1+(F_2+F_4)C_1+(F_{11}+F_{12}+F_{13})C_3+F_{17}C_4Q_{19}+F_{19}+F_{20}+F_{21}$$
$$S_{26}=(F_3+F_5)C_1+F_6\overline{C}_2+(F_7+F_8)C_2+F_{10}\overline{C}_3+(F_{12}+F_{14}Q_{19})C_3+F_{17}C_4Q_{110}+F_{19}+F_{20}+F_{21}$$
$$S_{27}=(F_3+F_5Q_{17})C_1+F_6\overline{C}_2+(F_7+F_9Q_{17})C_2+(F_{11}+F_{12}Q_{18}+F_{13}Q_{19}+F_{14}Q_{110})C_3+F_{15}+F_{16}+F_{17}C_4Q_{111}+F_{19}+F_{20}$$
$$S_{28}=(F_3+F_4Q_{17}+F_5Q_{18})C_1+(F_8+F_9Q_{18})C_2+(F_{11}Q_{17}+F_{12}Q_{19}+F_{13}Q_{110}+F_{14}Q_{111})C_3+F_{15}+F_{17}\overline{C}_4+F_{17}C_4Q_{112}+F_{19}+F_{21}Q_{112}$$
$$S_{29}=F_1\overline{C}_1Q_{14}+(F_3Q_{16}+F_4Q_{18}+F_5Q_{19})C_1+F_6\overline{C}_2Q_{15}+(F_8Q_{17}+F_9Q_{19})C_2+F_{10}\overline{C}_3Q_{16}+(F_{11}Q_{18}+F_{12}Q_{110}+F_{13}Q_{111}+F_{14}Q_{112})C_3+F_{15}Q_{17}+F_{16}Q_{18}+F_{17}\overline{C}_4Q_{19}+F_{17}C_4Q_{113}+F_{18}Q_{110}+F_{19}Q_{111}+F_{20}Q_{112}+F_{21}Q_{113}$$

The logic equations above are determined by the counter state shart of FIG. 9 and the address state chart of FIGURE 34 according to the following procedure. A stage of the address register must be set whenever a 1 appears in the FIG. 34 chart (e.g., $Q_{24}$ must be set when $F_{14}C_3$ exists—note that the latter term exists, in logic terminology whenever $F_{14}$ is generated by the circuitry of FIG. 6 and there is a 1 applied on the $C_3$ input).

Also, a stage must be set whenever a 1 is transferred from the counter to the address register as indicated by the X's (e.g., $Q_{26}$ must be SET whenever the term $F_{14}C_3$ exists *and* a 1 is located in $Q_{19}$—note that for $F_{14}$, the X in $Q_{19}$ of the word counter was transferred to $Q_{26}$ of the address register).

Thus, the specific example described provides a total of 456 addresses for 456 channels at rates of occurrence shown in the format table above. The particular format generated depends upon which of the input leads $C_1$–$C_4$ are energized. It will be apparent to those having ordinary skill in the art that the basic scheme described above in connection with a specific example is the same for generating a larger or smaller number of formats at different frame rates to apportion a larger or smaller number of total channels to the word slots in a frame.

Certain terms in the claims are defined herein. These terms are used to prevent the claims from being construed as applying to only one generator for generating a specific format. It will be apparent to those having ordinary skill in the art that the invention is not limited to any specific formats.

$n$=stages of the word counter
N=word slots per frame
$s$ or $t$=stages in word counter assigned $\phi$'s
$(n-s)$ or $(n-t)$=decoded stages of word counter
S or T=rate of occurrence
V or Z=stages in word counter assigned X's
$u$ or $w$=stages in word counter assigned 1's or 0's
$k$ or $y$=number of channels While the invention has been particularly shown and described with reference to preferred embodiments thereof, it will be understood by those skilled in the art that various changes in form and details may be made therein without departing from the spirit and scope of the invention.

What is claimed is:

1. A system for generating multiple formats having N slots per frame, said formats adapted for use in controlling a plurality of information devices, comprising
  (a) an N word slot counter having $n$ stages wherein $2^n \geq N$, each of the conditions of said counter from 0 to $N-1$ representing a word slot,
  (b) decode logic apparatus responsive to certain states of said word counter for generating said one of said formats, and
  (c) means for applying at least one change-format voltage input to said decode logic for causing said decode logic apparatus to respond to states of said word counter for generating a different format.

2. A multiple format generator as claimed in claim 1 wherein said decode logic apparatus comprises
  a first decode means responsive to the outputs from $(n-s_1)$ stages of said word counter for generating $k_1$ different outputs at a rate of $S_1$ times per frame, wherein $s_1$ is the number of stages of the word counter which controls the rate $S_1$, a second decode means responsive to the outputs from $(n-s_2)$ stages of said word counter and the absence of a change-format voltage lead for generating $k_2$ different outputs at a rate of $S_2$ times per frame, wherein $s_2$ is the number of stages of the word counter which controls the rate $S_2$.

3. A multiple format generator as claimed in claim 2 wherein said decode logic apparatus further comprises
  a third decode means responsive to a plurality of word counter state outputs and to a change-format voltage signal for generating a plurality of outputs which occur at the identical counts of said word counter as the $k_2$ outputs from said second decode means.

4. A multiple format generator as claimed in claim 3 wherein said third decode means comprises
  a plurality of logic means, one through $m$, responsive respectively to outputs from $(n-t_1)$ through $(n-t_m)$ stages of said word counter for generating $y_1$ through $y_m$ outputs respectively at rates $T_1$ through $T_m$ respectively, wherein $t$ is the number of stages of the word counter which controls the rate T and where $$\sum_{a=1}^{m} y_a T_a = k_2 S_2$$

5. A multiple format generator as claimed in claim 2 wherein said first decode means comprises $k_1$ channel defining means, each of said $k_1$ channel defining means being responsive to the coincidence of the same outputs from $u_1$ of the $(n-s_1)$ stages and a different one of the combination of outputs available from the remaining $v_1$ of the $(n-s_1)$ stages, wherein the number of channels $k_1$ is equal to the number of inputs to the word counter necessary to recycle the $v_1$ stages and $(v_1+u_1)=(n-s_1)$, for generating a single output at the rate of $S_1$ times per frame.

6. A multiple format generator as claimed in claim 4 wherein said first decode means comprises $k_1$ channel defining means, each of said $k_1$ channel defining means being responsive to the coincidence of the same outputs from $u_1$ of the $(n-s_1)$ stages and a different one of the combination of outputs available from the remaining $v_1$ of the $(n-s_1)$ stages, wherein the number of channels $k_1$ is equal to the number of inputs to the word counter necessary to recycle the $v_1$ stages and $(V_1+u_1)=(n-s_1)$, for generating a single output at the rate of $S_1$ times per frame.

7. A multiple format generator as claimed in claim 5 wherein the $n-s_1$ stages of the word counter are the lowest order stages of the word counter.

8. A multiple format generator as claimed in claim 6 wherein the $n-s_1$ stages of the word counter are the lowest order stages of the word counter.

9. A multiple format generator as claimed in claim 7 wherein the $v_1$ stages are the highest order stages of the $n-s_1$ group of stages.

10. A multiple format generator as claimed in claim 8 wherein the $v_1$ stages are the highest order stages of the $n-s_1$ group of stages.

11. A multiple format generator as claimed in claim 7 wherein the two of the $v_1$ stages are the two lowest order stages of the word counter and the remaining $v_1$ stages are the highest order stages of the $(n-s_1)$ group of stages.

12. A multiple format generator as claimed in claim 8 wherein two of the $v_1$ stages are the two lowest order stages of the word counter and the remaining $v_1$ stages are the highest order stages of the $(n-s_1)$ group of stages.

13. A multiple format generator as claimed in claim 4 wherein each of said logic means comprises a number of channel defining means, the number of channel defining means being equal to number $y_a$ for the respective logic means, each of said channel defining means for logic means "$a$" being responsive to the coincidence of the same outputs from $w_a$ of the $(n-t_a)$ stages and a different one of the combination of outputs available from the remaining $Z_a$ of the $(n-t_a)$ stages, for generating a single output at the rate of $T_a$ times per frame, wherein the number of channels $y_a$ is equal to the number of inputs to the word counter necessary to recycle the $Z_a$ stages and $$Z_a + w_a = (n-t_a)$$

and "$a$" goes from 1 to $m$.

14. A multiple format generator as claimed in claim 8 wherein each of said logic means comprises a number of channel defining means, the number of channel defining means being equal to number $y_a$ for the respective logic means, each of said channel defining means for logic means "$a$" being responsive to the coincidence of the same outputs from $w_a$ of the $(n-t_a)$ stages and a different one of the combination of outputs available from the remaining $Z_a$ of the $(n-t_a)$ stages, for generating a single output at the rate of $T_a$ times per frame, wherein the number of channels $y_a$ is equal to the number of inputs to the word counter necessary to recycle the $Z_a$ stages and $$Z_a+w_a=(n-t_a)$$

and "$a$" goes from 1 to $m$.

15. A multiple format generator as claimed in claim 14 wherein $n-t_a$ stages of the word counter are the lowest order stages of the word counter.

16. A multiple format generator as claimed in claim 15 wherein the $Z_a$ stages are the highest order stages of the $n-t_a$ group of stages.

17. A multiple format generator as claimed in claim 15 wherein two of the $Z_a$ stages are the two lowest order stages of the word counter and the remaining $Z_a$ stages are the highest order stages of the $n-t_a$ group of stages.

18. A system for generating multiple formats, each of said formats consisting of a plurality of addresses occurring at various rates per frame wherein each frame is composed of N word slots, comprising (a) an N word counter having $n$ stages for defining the N word slots of the frame wherein $2^n \geq N$, (b) an address register having a sufficient number of binary stages for defining a unique combination of 1's and 0's for each address, (c) at least one change-format gating input, (d) decode logic apparatus responsive to the outputs of said counter stages and said gating input for generating a first plurality of addresses at various rates per frame in said address register in the presence of a 0 input on said gating input and for generating a second plurality of addresses at various rates per frame in said address register in the presence of a 1 input on said gating input, said first and second plurality of addresses including some of the same addresses and each of said plurality of addresses occurring at such rates as to occupy all N word slots.

19. A multiple format generator as claimed in claim 18 wherein said decode logic apparatus comprises $x$ decoding means responsive respectively to $x$ combinations of 1's and 0's from $n-(s_1+v_1)$ to $n-(s_x+v_x)$ stages, respectively, of said word counter for producing group outputs $F_1$ through $F_x$ respectively wherein $s$ is the number of stages of the word counter which controls the rate of occurrence of the addresses in a group, and $v$ is the number of stages of the word counter which determines the number of addresses in each group.

20. A multiple format generator as claimed in claim 19 wherein said decode logic apparatus further comprises first means responsive to said $F_1$ group output for transferring the contents of said $V_1$ stages of said word counter to the address register and for setting a predetermined number of the remaining address stages, and second means responsive to a 0 on said gating input and to said $F_2$ group output for transferring the contents of said $V_2$ stages of said word counter to said address register and for setting a predetermined number of the remaining address stages.

21. A multiple format generator as claimed in claim 19 wherein said decode logic apparatus further comprises third means responsive to a 1 on said gating input and to said $F_3$ group output for transferring the contents of said $V_3$ stages of said word counter to said address register and for setting a predetermined number of the remaining address stages.

22. A multiple format generator as claimed in claim 18 further comprising additional change format gating inputs, and mean in said decode logic apparatus for generating a separate plurality of addresses for each combination of 1's and 0's on said change-format gating inputs.

References Cited

UNITED STATES PATENTS

| | | | |
|---|---|---|---|
| 3,202,972 | 8/1965 | Stafford et al. | 340—172.5 |
| 3,229,259 | 1/1966 | Barker et al. | 340—172.5 |
| 3,239,832 | 3/1966 | Renard | 340—172.5 |
| 3,299,210 | 1/1967 | Bandy | 340—172.5 |
| 3,351,915 | 11/1967 | Fought et al. | 340—172.5 |

GARETH D. SHAW, Primary Examiner

P. R. WOODS, Assistant Examiner